United States Patent
Tu et al.

(10) Patent No.: US 10,222,549 B2
(45) Date of Patent: Mar. 5, 2019

(54) MODE MULTIPLEXER/DEMULTIPLEXER AND SWITCHING NODE

(71) Applicant: Huawei Technologies Co., Ltd., Shenzhen (CN)

(72) Inventors: Xin Tu, Wuhan (CN); Dongyu Geng, Shenzhen (CN); Fei Zhao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/495,583

(22) Filed: Apr. 24, 2017

(65) Prior Publication Data
US 2017/0227711 A1    Aug. 10, 2017

Related U.S. Application Data

(63) Continuation of application No. PCT/CN2014/089487, filed on Oct. 24, 2014.

(51) Int. Cl.
*G02B 6/12* (2006.01)
*G02B 6/30* (2006.01)
(Continued)

(52) U.S. Cl.
CPC ......... *G02B 6/12007* (2013.01); *G02B 6/125* (2013.01); *G02B 6/14* (2013.01);
(Continued)

(58) Field of Classification Search
CPC ...... G02B 6/12007; G02B 6/125; G02B 6/14; G02B 6/30; G02B 6/29331; H04J 14/04
See application file for complete search history.

(56) References Cited

U.S. PATENT DOCUMENTS

2003/0048986 A1*  3/2003  Huang ............... G02B 6/14
                                                    385/28
2017/0299812 A1* 10/2017  Zhao ................. H04J 14/04

FOREIGN PATENT DOCUMENTS

CN        103023600 A    4/2013
CN        103095373 A    5/2013
(Continued)

OTHER PUBLICATIONS

Ho et al., "Wavelength-Selective Switches for Mode-Division-Multiplexed Systems," IEEE Journal of Lightwave Technology, vol. 32, Issue No. 22, pp. 1-12, Institute of Electrical and Electronics Engineers, New York, New York (Jan. 2014).

*Primary Examiner* — John Bedtelyon
(74) *Attorney, Agent, or Firm* — Leydig, Voit & Mayer, Ltd.

(57) ABSTRACT

The present invention discloses a mode multiplexer/demultiplexer and a switching node. The mode multiplexer/demultiplexer includes a multi-mode optical waveguide, a first transmission optical waveguide, and a second transmission optical waveguide. The multi-mode optical waveguide includes a first mode channel and a second mode channel. The first transmission optical waveguide includes a first coupling region that includes a first fundamental-mode channel, and the first fundamental-mode channel performs optical mode coupling with the first mode channel in the multi-mode optical waveguide. The second transmission optical waveguide includes a second coupling region that includes a second fundamental-mode channel, and the second fundamental-mode channel performs optical mode coupling with the second mode channel in the multi-mode optical waveguide. An effective refractive index of a fundamental-mode optical signal in the first coupling region is different from an effective refractive index of the same (Continued)

fundamental-mode optical signal in the second coupling region.

12 Claims, 12 Drawing Sheets

(51) Int. Cl.
    *G02B 6/14*          (2006.01)
    *G02B 6/293*        (2006.01)
    *G02B 6/125*        (2006.01)
    *H04J 14/04*       (2006.01)

(52) U.S. Cl.
    CPC .......... *G02B 6/29331* (2013.01); *G02B 6/30* (2013.01); *H04J 14/04* (2013.01)

(56) References Cited

FOREIGN PATENT DOCUMENTS

| | | |
|---|---|---|
| CN | 103345022 A | 10/2013 |
| EP | 0604894 A1 | 7/1994 |
| EP | 1426799 A2 | 6/2004 |
| EP | 2234294 A1 | 9/2010 |
| EP | 2645609 A1 | 10/2013 |
| JP | 2014119556 A | 6/2014 |
| WO | WO 2013188592 A1 | 12/2013 |

* cited by examiner

MODE MULTIPLEXER/DEMULTIPLEXER AND SWITCHING NODE

CROSS-REFERENCE TO RELATED APPLICATIONS

This application is a continuation of International Application No. PCT/CN2014/089487, filed on Oct. 24, 2014, the disclosure of which is hereby incorporated by reference in its entirety.

TECHNICAL FIELD

Embodiments of the present disclosure relate to the communications field, and more specifically, to a mode multiplexer/demultiplexer and a switching node.

BACKGROUND

An optical network-on-chip system is a technology in which multiple modules with different functions are integrated on a same chip. As a new technology for all-optical switching and short-range interconnection, the optical network-on-chip system has advantages of high reliability, low power consumption, low costs, and the like. FIG. 1 schematically shows an architecture of a switching node 100 in a typical optical network-on-chip system. The switching node 100 includes a substrate 160. A wavelength division demultiplexer 110, an N×M optical switch 120, a wavelength division multiplexer (WDM) 130, a photodetector 140, and a very large scale integrated circuit (VLSI) 150 are disposed on the substrate 160. The VLSI 150 is configured to control at least one electrically-driven component included in the switching node, for example, the photodetector 140. The wavelength division demultiplexer 110 is configured to receive an optical signal that is input from an input fiber and that includes multiple wavelengths, demultiplex the received optical signal into multiple optical signals that each have a single wavelength, and transmit the multiple optical signals to the N×M optical switch 120. The wavelengths of the multiple optical signals are mutually different. The N×M optical switch 120 is configured to receive the multiple optical signals transmitted by the wavelength division demultiplexer 110, determine an output port of each of the multiple optical signals according to destination nodes of the multiple optical signals, and output the multiple optical signals from output ports respectively corresponding to the multiple optical signals. Specifically, for one optical signal of the multiple optical signals, if a destination node of the optical signal is the switching node 100, the N×M optical switch 120 outputs the optical signal by using an output port corresponding to the photodetector 140; if the destination node of the optical signal is another node than the switching node 100, the N×M optical switch 120 outputs the optical signal by using an output port corresponding to the another node. The WDM 130 is configured to receive at least one optical signal transmitted by the N×M optical switch 120, and multiplex the received at least one optical signal into an optical signal including at least one wavelength. The photodetector 140 is configured to receive the at least one optical signal transmitted by the N×M optical switch 120, and convert the received at least one optical signal into an electrical signal.

A mode division multiplexing (MDM) technology can effectively improve performance of an optical network system. Therefore, how to apply the MDM technology to the optical network-on-chip system is a research hotspot in the field. In the MDM technology, a planar multi-mode waveguide is used in a photonic integrated circuit (PIC) to replace a conventional planar single-mode waveguide, and different pieces of information are loaded to orthogonal eigenmodes (eigenmode) of the planar multi-mode waveguide for transmission, where the eigenmodes have a same frequency, different spatial energy distribution, and different mode orders. A core of the on-chip MDM technology lies in a mode multiplexer/demultiplexer corresponding to the planar multi-mode waveguide. However, currently, there is no satisfying mode multiplexer/demultiplexer applicable to the optical network-on-chip system.

SUMMARY

An embodiment of the present invention provides a mode multiplexer/demultiplexer, including: a multi-mode optical waveguide, a first transmission optical waveguide, and a second transmission optical waveguide, where the multi-mode optical waveguide includes a first mode channel and a second mode channel, the first mode channel transmits a first-mode optical signal, the second mode channel transmits a second-mode optical signal, and a first mode is different from a second mode; the first transmission optical waveguide includes a first coupling region and a first input/output region, the first coupling region and the first input/output region include a first fundamental-mode channel, the first fundamental-mode channel transmits a fundamental-mode optical signal, and the first fundamental-mode channel in the first coupling region performs optical mode coupling with the first mode channel in the multi-mode optical waveguide; the second transmission optical waveguide includes a second coupling region and a second input/output region, the second coupling region and the second input/output region include a second fundamental-mode channel, the second fundamental-mode channel transmits a fundamental-mode optical signal, and the second fundamental-mode channel in the second coupling region performs optical mode coupling with the second mode channel in the multi-mode optical waveguide; and an effective refractive index of a fundamental-mode optical signal in the first coupling region is different from an effective refractive index of the same fundamental-mode optical signal in the second coupling region.

Another embodiment of the present invention provides a switching node, including: one mode demultiplexer, $N_1$ wavelength demultiplexers, and $M_1$ optical switches, where the mode demultiplexer is the mode multiplexer/demultiplexer according to any one of claims 1 to 8, $1<N_1\le N$, and $M_1$ is an integer greater than 1; the mode demultiplexer is configured to receive an optical signal, where the optical signal includes optical signals that are in $N_2$ modes and that have $M_2$ wavelengths, $M_2\le M_1$, and $1<N_2\le N_1$; the mode demultiplexer is further configured to: split the optical signal into $N_2$ fundamental-mode optical signals, and transmit the $N_2$ fundamental-mode optical signals to the $N_1$ wavelength demultiplexers, where each of the $N_2$ fundamental-mode optical signals is an optical signal with at least one wavelength; a first wavelength demultiplexer in the $N_1$ wavelength demultiplexers is configured to receive a fundamental-mode optical signal that is transmitted by the mode demultiplexer and that includes $M_2$ wavelengths, split the received fundamental-mode optical signal into $M_2$ fundamental-mode optical signals, and transmit the obtained $M_2$ fundamental-mode optical signals to the $M_1$ optical switches, where each of the $M_2$ fundamental-mode optical signals has a single wavelength, and wavelengths of the $M_2$ fundamental-mode optical signals are mutually different;

and a first optical switch in the $M_1$ optical switches is configured to receive at least one fundamental-mode optical signal that is transmitted by the $N_1$ wavelength demultiplexers and that has a single wavelength, and route the received at least one fundamental-mode optical signal according to a destination node of the received at least one fundamental-mode optical signal.

BRIEF DESCRIPTION OF DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various communications systems, such as a wavelength division multiplexing (WDM) system, a mode division multiplexing (MDM) system, a frequency division multiplexing (FDM) system, a time division multiplexing (TDM) system, and a few mode fiber (FMF) communications system.

In an optical network-on-chip system, different modes may be converted, split, and combined by using an effective refractive index principle, that is, two modes with similar or equal effective refractive indexes in two neighboring waveguides may be mutually converted. Specifically, when two modes corresponding to two waveguides neighboring in space have similar or equal effective refractive indexes, the two modes meet a mode match condition, and energy coupling and mode conversion may occur between the two modes that meet the mode match condition. For example, if an effective refractive index of an optical signal in a mode 1 in a waveguide 1 is equal or similar to an effective refractive index of an optical signal in a mode 2 in a waveguide 2, and the waveguide 1 and the waveguide 2 meet an evanescent field coupling condition, that is, a distance between the waveguide 1 and the waveguide 2 is less than or equal to a wavelength of an optical signal in the vacuum, the mode 1 in the waveguide 1 may be coupled with the mode 2 in the waveguide 2. Therefore, optical energy of the mode 1 transmitted in the waveguide 1 is coupled to the mode 2 in the waveguide 2, or optical energy of the mode 2 transmitted in the waveguide 2 is coupled to the mode 1 in the waveguide 1.

Figure 1:
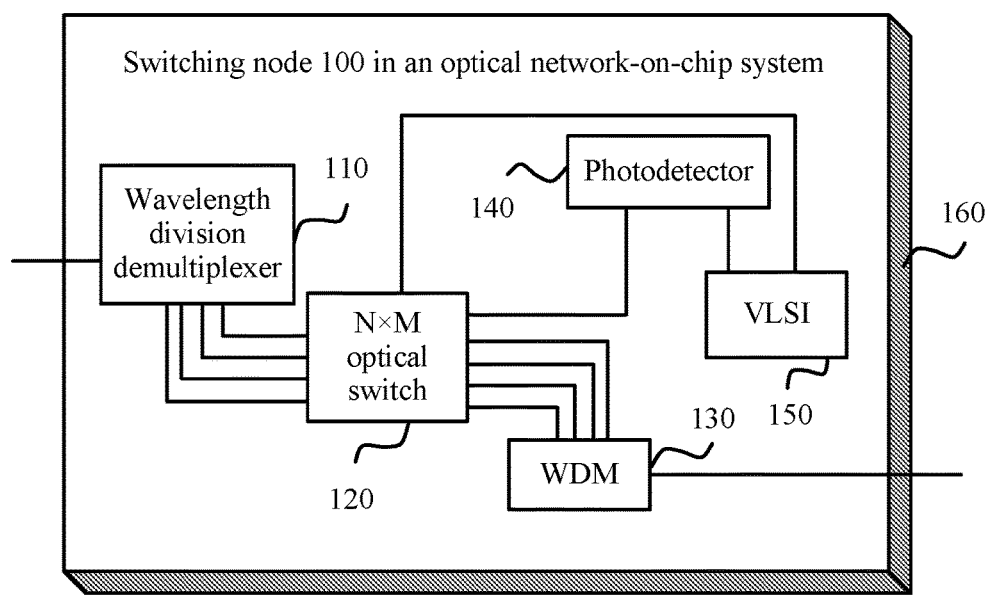
FIG. 1 is a schematic diagram of an architecture of a switching node in a typical optical network-on-chip system.
Figure 2:
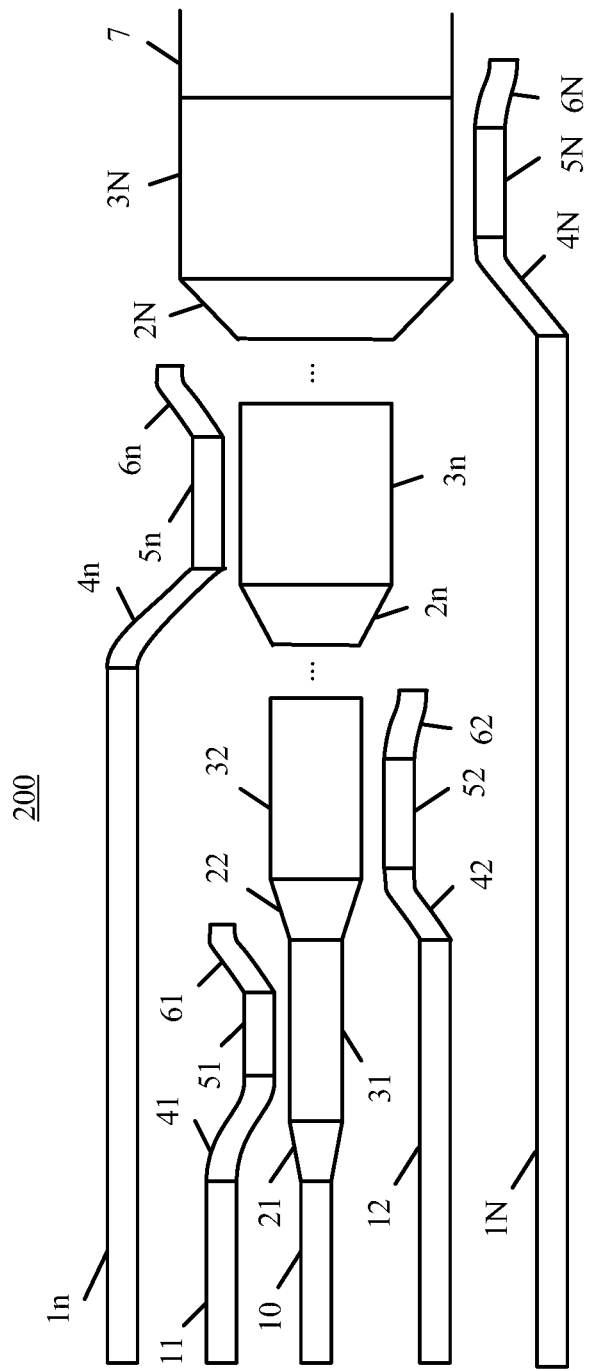
FIG. 2 is a top view of a mode multiplexer/demultiplexer in the prior art.

FIG. 2 schematically shows a mode multiplexer/demultiplexer 200 in the prior art. The mode multiplexer/demultiplexer 200 includes: N+1 input optical waveguides, N tapered optical waveguides (21, 22, . . . , 2N), N multi-mode optical waveguides (31, 32, . . . , 3N), and an output optical waveguide 7. The N+1 input optical waveguides may have one width value and are configured to transmit only a fundamental-mode optical signal (that is, an optical signal in a zero-order mode). In this case, effective refractive indexes of the fundamental-mode optical signal in the N+1 input optical waveguides are equal or similar. Each of the N multi-mode optical waveguides has multiple mode channels, and the multiple mode channels are separately configured to transmit optical signals that are in different order modes. In addition, any two of the N multi-mode optical waveguides have different width values; therefore, optical signals in one mode have different effective refractive indexes in two different multi-mode optical waveguides, and a multi-mode optical waveguide of a larger width supports a larger quantity of modes. Specifically, the N+1 input optical waveguides include an input optical waveguide 10 and N other input optical waveguides. The input optical waveguide 10 is connected to the tapered optical waveguide 21 and the multi-mode optical waveguide 31 successively, and each of the N other input optical waveguides includes a first curved part (41, 42, . . . , 4N), a coupling part (51, 52, . . . , 5N), and a second curved part (61, 62, . . . , 6N) that are successively connected. A coupling part $5n$ included in the $n^{th}$ input optical waveguide in the N other input optical waveguides is disposed in parallel to a multi-mode optical waveguide $3n$, and the coupling part $5n$ and a mode channel n in the multi-mode optical waveguide $3n$ meet a mode match condition, that is, an effective refractive index of a fundamental-mode optical signal in the coupling part $5n$ is similar or equal to an effective refractive index of an optical signal in an n-order mode in the multi-mode optical waveguide $3n$, where n=1, 2, ..., N. In this way, the fundamental-mode optical signal transmitted in the coupling part $5n$ may be coupled to the optical signal in the n-order mode in the multi-mode optical waveguide $3n$.

Specifically, if the mode multiplexer/demultiplexer 200 implements mode division multiplexing, each of the N+1 input optical waveguides receives a fundamental-mode optical signal from an input end. A fundamental-mode optical signal received by the input optical waveguide 10 is transmitted to the output optical waveguide 7 successively through the tapered optical waveguide 21, the multi-mode optical waveguide 31, the tapered optical waveguide 22, the multi-mode optical waveguide 32, ..., the tapered optical waveguide 2N, and the multi-mode optical waveguide 3N. A fundamental-mode optical signal received by a single-mode part $1n$ of the $n^{th}$ input optical waveguide in the N other input optical waveguides is transmitted to the coupling part $5n$ through a first curved part $4n$, where n=1, 2, ..., N. Then, the fundamental-mode optical signal is coupled, from the coupling part $5n$, to the optical signal in the n-order mode in the multi-mode optical waveguide $3n$, and is transmitted to the output optical waveguide 7 successively through a tapered optical waveguide $2(n+1)$, a multi-mode optical waveguide $3(n+1)$, ..., the tapered optical waveguide 2N, and the multi-mode optical waveguide 3N. In this way, the output optical waveguide 7 receives optical signals that are in N different modes, and the optical signals in the N different modes are separately the fundamental-mode optical signal, an optical signal in a one-order mode, ..., the optical signal in the n-order mode, ..., and an optical signal in an N-order mode.

The inventor finds through research that, in the mode multiplexer/demultiplexer 200: 1. Two neighboring multi-mode optical waveguides are connected by using an extra tapered optical waveguide, and consequently, an overall length of the mode multiplexer/demultiplexer 200 is relatively large; 2. When a coupling region is to perform optical mode coupling with a multi-mode optical waveguide, because a fundamental-mode optical signal has a relatively large effective refractive index in the coupling region, to improve coupling efficiency, it is required to ensure a relatively large length of the coupling region, and consequently, the overall length of the mode multiplexer/demultiplexer 200 is further increased; 3. An overall volume of the mode multiplexer/demultiplexer 200 is relatively large; this is unfavorable to multiplexing and transmission of optical signals that are in more modes, and expansibility is poor.

Figure 3:
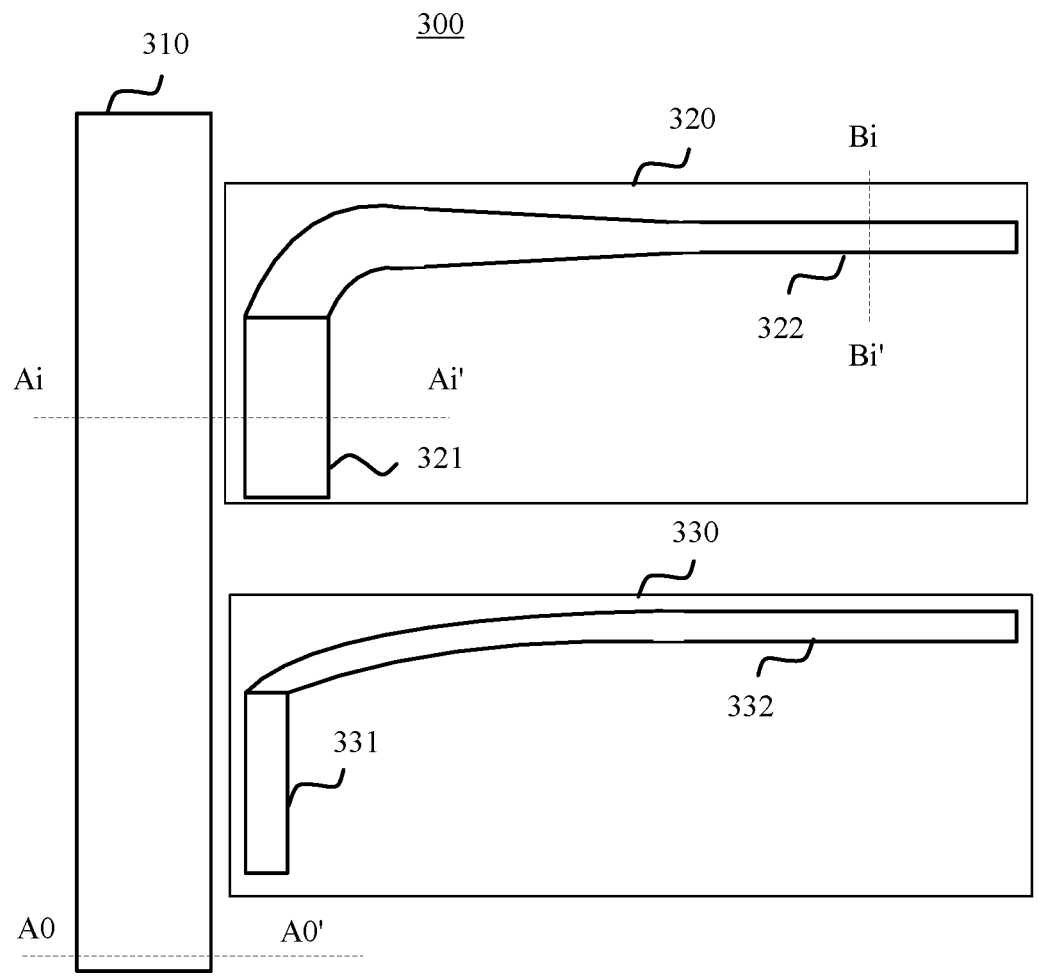
FIG. 3 is a top view of a mode multiplexer/demultiplexer according to an embodiment of the present invention.

FIG. 3 schematically shows a top view of a mode multiplexer/demultiplexer 300 according to an embodiment of the present invention. The mode multiplexer/demultiplexer 300 is mainly applied to an optical network-on-chip, or may be applied to another optical network. The mode multiplexer/demultiplexer 300 includes: a multi-mode optical waveguide 310, a first transmission optical waveguide 320, and a second transmission optical waveguide 330.

The multi-mode optical waveguide 310 includes a first mode channel and a second mode channel. The first mode channel transmits a first-mode optical signal, the second mode channel transmits a second-mode optical signal, and a first mode is different from a second mode.

The first transmission optical waveguide 320 includes a first coupling region 321 and a first input/output region 322. The first coupling region 321 and the first input/output region 322 include a first fundamental-mode channel, the first fundamental-mode channel transmits a fundamental-mode optical signal, and the first fundamental-mode channel in the first coupling region 321 performs optical mode coupling with the first mode channel in the multi-mode optical waveguide 310.

The second transmission optical waveguide 330 includes a second coupling region 331 and a second input/output region 332. The second coupling region 331 and the second input/output region 332 include a second fundamental-mode channel, the second fundamental-mode channel transmits a fundamental-mode optical signal, and the second fundamental-mode channel in the second coupling region 331 performs optical mode coupling with the second mode channel in the multi-mode optical waveguide 310.

An effective refractive index of a fundamental-mode optical signal in the first coupling region 321 is different from an effective refractive index of the same fundamental-mode optical signal in the second coupling region 331.

Therefore, the mode multiplexer/demultiplexer 300 according to this embodiment of the present invention includes a multi-mode optical waveguide, a first transmission optical waveguide, and a second transmission optical waveguide. The first transmission optical waveguide and the second transmission optical waveguide respectively include a first coupling region and a second coupling region. Both the first coupling region and the second coupling region transmits a fundamental-mode optical signal, and an effective refractive index of a fundamental-mode optical signal in the first coupling region is different from an effective refractive index of the same fundamental-mode optical signal in the second coupling region. In this way, the first transmission optical waveguide and the second transmission optical waveguide can respectively meet a mode match condition with and perform optical mode coupling with channels that are in different modes in the multi-mode optical waveguide, and can couple fundamental-mode optical signals transmitted in the first transmission optical waveguide and the second transmission optical waveguide as optical signals that are in different modes in the multi-mode optical waveguide, or respectively couple two optical signals that are in different modes and transmitted in the multi-mode optical waveguide as fundamental-mode optical signals in the first transmission optical waveguide and the second transmission optical waveguide, so as to implement mode division multiplexing or demultiplexing in an optical network-on-chip system.

In this embodiment of the present invention, the multi-mode optical waveguide 310 includes the first mode channel and the second mode channel that can respectively transmit the first-mode optical signal and the second-mode optical signal. One of the first mode and the second mode may be a fundamental mode, and the other is a high-order mode (that is, a non-zero order mode). Alternatively, both the first mode and the second mode may be high-order modes. This is not limited in this embodiment of the present invention. Optionally, the multi-mode optical waveguide 310 may further include another mode channel, and the another mode channel is configured to transmit an optical signal that is in another mode. For example, the multi-mode optical waveguide 310 includes N mode channels, and the N mode channels are in one-to-one correspondence with optical signals that are in N different modes. However, this is not limited in this embodiment of the present invention.

In this embodiment of the present invention, an effective refractive index of a fundamental-mode optical signal in the first coupling region 321 is different from an effective refractive index of the same fundamental-mode optical signal in the second coupling region 331. The first transmission optical waveguide 320 and the second transmission optical waveguide 330 may be located on one side of the multi-mode optical waveguide 310; or the first transmission optical waveguide 320 and the second transmission optical waveguide 330 may be located on two sides of the multi-mode optical waveguide 310. This is not limited in this embodiment of the present invention. In addition, the first transmission optical waveguide 320 and the second transmission optical waveguide 330 may be disposed in any order. This is not limited in this embodiment of the present invention.

The first fundamental-mode channel in the first coupling region 321 and the first mode channel in the multi-mode optical waveguide 310 meet the mode match condition, that is, the effective refractive index of the fundamental-mode optical signal in the first coupling region 321 is equal or similar to an effective refractive index of the first-mode optical signal on the first mode channel in the multi-mode optical waveguide 310. In addition, a distance between the first coupling region 321 and the multi-mode optical waveguide 310 is less than or equal to a wavelength of an optical signal in the vacuum, that is, the first coupling region 321 and the multi-mode optical waveguide 310 meet an evanescent field coupling condition. Therefore, the first fundamental-mode channel in the first coupling region 321 performs optical mode coupling with the first mode channel in the multi-mode optical waveguide 310. The fundamental-mode optical signal transmitted on the first fundamental-mode channel in the first coupling region 321 is coupled to the first mode channel in the multi-mode optical waveguide 310, or the first-mode optical signal transmitted on the first mode channel in the multi-mode optical waveguide 310 is coupled to the first fundamental-mode channel in the first coupling region 321.

Similarly, the second fundamental-mode channel in the second coupling region 331 and the second mode channel in the multi-mode optical waveguide 310 meet the mode match condition, that is, the effective refractive index of the fundamental-mode optical signal in the second coupling region 331 is equal or similar to an effective refractive index of the second-mode optical signal on the second mode channel in the multi-mode optical waveguide 310. In addition, a distance between the second coupling region 331 and the multi-mode optical waveguide 310 is less than or equal to the wavelength of the optical signal in the vacuum, that is, the second coupling region 331 and the multi-mode optical waveguide 310 meet the evanescent field coupling condition. Therefore, the second fundamental-mode channel in the second coupling region 331 performs optical mode coupling with the second mode channel in the multi-mode optical waveguide 310. The fundamental-mode optical signal transmitted on the second fundamental-mode channel in the second coupling region 331 is coupled to the second mode channel in the multi-mode optical waveguide 310, or the second-mode optical signal transmitted on the second mode channel in the multi-mode optical waveguide 310 is coupled to the second fundamental-mode channel in the second coupling region 331.

Optionally, the mode multiplexer/demultiplexer 300 may further include another transmission optical waveguide, and the another transmission optical waveguide is configured to perform optical mode coupling with another mode channel in the multi-mode optical waveguide 310. For example, the mode multiplexer/demultiplexer 300 includes N transmission optical waveguides, a coupling region of each transmission optical waveguide, includes one fundamental-mode channel, and fundamental-mode channels in the N transmission optical waveguides can respectively perform optical mode coupling with channels that are in N different modes in the multi-mode optical waveguide 310. However, this is not limited in this embodiment of the present invention.

In this embodiment of the present invention, one fundamental-mode optical signal may have different effective refractive indexes in the first coupling region 321 and the second coupling region 331. In addition, if a difference between a wavelength of a first fundamental-mode optical signal transmitted in the first coupling region 321 and a wavelength of a second fundamental-mode optical signal transmitted in the second coupling region 331 is less than a preset threshold, an effective refractive index of the first fundamental-mode optical signal in the first coupling region 321 is different from an effective refractive index of the second fundamental-mode optical signal in the second coupling region 331, the effective refractive index of the first fundamental-mode optical signal in the first coupling region 321 is equal or similar to an effective refractive index of the first-mode optical signal in the multi-mode optical waveguide 310, and the effective refractive index of the second fundamental-mode optical signal in the second coupling region 331 is equal or similar to an effective refractive index of the second-mode optical signal in the multi-mode optical waveguide 310. However, this is not limited in this embodiment of the present invention.

Optionally, configuration of the first transmission optical waveguide 320 and configuration of the second transmission optical waveguide 330 may meet a preset condition, so that the effective refractive index of the first fundamental-mode optical signal in the first coupling region 321 is equal or similar to the effective refractive index of the second fundamental-mode optical signal in the second coupling region 331. The first fundamental-mode optical signal and the second fundamental-mode optical signal are same fundamental-mode optical signals, or a wavelength of the first fundamental-mode optical signal is the same as a wavelength of the second fundamental-mode optical signal. The preset condition may include at least one of the following conditions:

the first coupling region 321 and the second coupling region 331 are of different widths;

the first transmission optical waveguide 320 and the second transmission optical waveguide 330 are of different heights; or the first transmission optical waveguide 320 and the second transmission optical waveguide 330 are made from different materials.

In an optional embodiment, the first coupling region 321 and the second coupling region 331 are of different widths. In this case, the first transmission optical waveguide 320 and the second transmission optical waveguide 330 may be made from same materials and may be of same heights. However, this is not limited in this embodiment of the present invention.

The first coupling region and the second coupling region may be 10 μm to 100 μm in length, and may be 0.4 μm to 10 μm in width. For example, a width of at least one of the first input/output region or the second output region may be less than 0.5 μm. However, this is not limited in this embodiment of the present invention.

Figure 4:
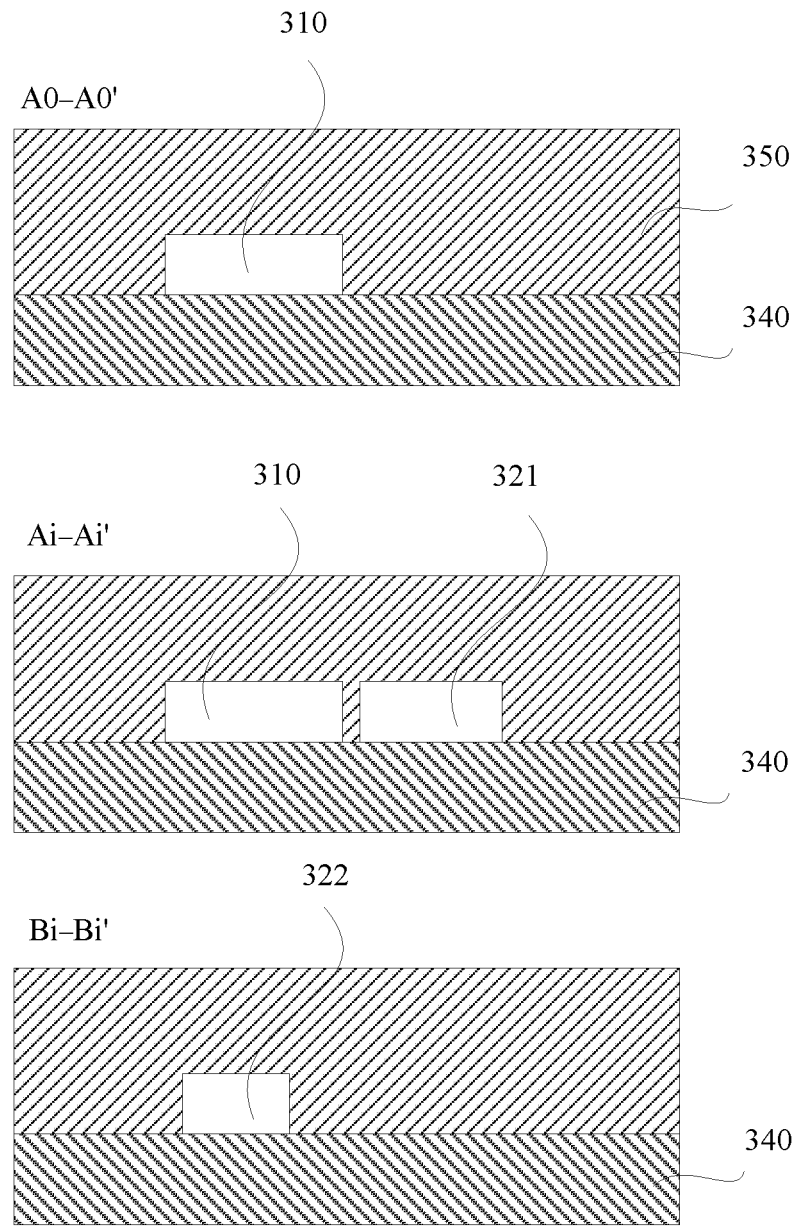
FIG. 4 is a sectional view of the mode multiplexer/demultiplexer shown in FIG. 3.

FIG. 4 shows multiple sectional views of the mode multiplexer/demultiplexer 300 shown in FIG. 3. The mode multiplexer/demultiplexer 300 includes a substrate 340. The multi-mode optical waveguide 310, the first transmission optical waveguide 320, and the second transmission optical waveguide 330 are disposed on the substrate 340. A covering layer 350 (not shown in FIG. 3) is disposed on the multi-mode optical waveguide 310, the first transmission optical waveguide 320, and the second transmission optical waveguide 330. Optionally, the covering layer 350 and the substrate 340 may be made from same or different materials. For example, the substrate 340 is made from silicon dioxide, and the covering layer 350 is made from silicon dioxide or a polymethyl methacrylate PMMA material. In this case, the multiple optical waveguides included in the mode multiplexer/demultiplexer 300 may be silicon waveguides. However, this is not limited in this embodiment of the present invention.

Figure 5:
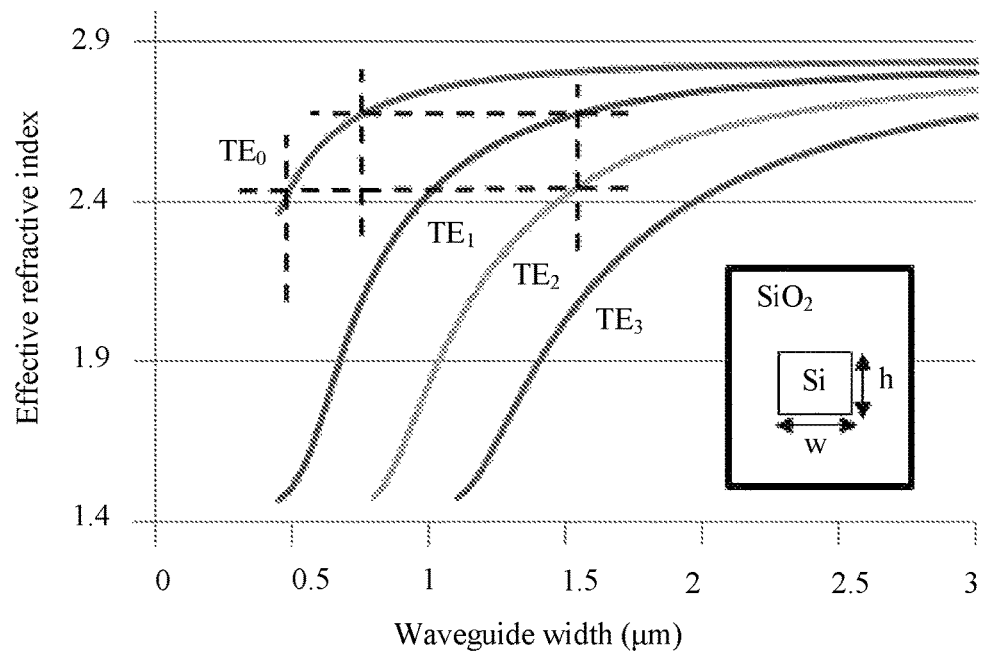
FIG. 5 is a curve graph indicating variation of effective refractive indexes of optical signals in different modes with a waveguide width according to an embodiment of the present invention.

FIG. 5 shows curves indicating variation of effective refractive indexes of optical signals whose wavelengths are 1550 nm and that are in modes TE0 to TE3 with a waveguide width. As shown in FIG. 5, an effective refractive index of a TE2-mode optical signal in a waveguide whose width is 1.6 μm is similar to an effective refractive index of a TE0-mode optical signal in a waveguide whose width is 0.5 μm, and an effective refractive index of a TE1-mode optical signal in the waveguide whose width is 1.6 μm is similar to an effective refractive index of the TE0-mode optical signal in a waveguide whose width is 0.8 μm. Therefore, widths of the multi-mode optical waveguide 310, the first coupling region 321, and the second coupling region 331 may be designed according to FIG. 5, so that the first fundamental-mode channel in the first coupling region 321 and the first mode channel in the multi-mode optical waveguide 310 meet the mode match condition, and the second fundamental-mode channel in the second coupling region 331 and the second mode channel in the multi-mode optical waveguide 310 meet the mode match condition, but this embodiment of the present invention is not limited thereto.

Length configuration of the first coupling region, the second coupling region, and the multi-mode optical waveguide may lead to relatively high coupling efficiency of the optical mode coupling. It may be learned from FIG. 5 that an effective refractive index of a fundamental-mode optical signal increases with a waveguide width. Different from the prior art in which input/output regions are of same relatively large widths, the first coupling region and the second coupling region are of different widths. Therefore, an effective refractive index of a fundamental-mode optical signal in the first coupling region and/or the second coupling region is reduced, so as to reduce a length of the first coupling region and/or the second coupling region while ensuring required coupling efficiency, and further reduce an overall length of the mode multiplexer/demultiplexer.

In this embodiment of the present invention, there is a channel used for transmitting a fundamental-mode optical signal between the first coupling region 321 and the first input/output region 322, so that the first coupling region 321 transmits a fundamental-mode optical signal to the first input/output region 322, and the first input/output region 322 transmits a fundamental-mode optical signal to the first coupling region 321. Specifically, the first coupling region 321 may be neighboring to the first input/output region 322, and in this case, the first coupling region 321 is directly connected to the first input/output region 322. Alternatively, the first coupling region 321 may be not neighboring to the first input/output region 322, and in this case, the first coupling region 321 is indirectly connected to the first input/output region 322 by using another region. This is not limited in this embodiment of the present invention. Optionally, the first coupling region 321 and the first input/output region 322 transmits only a fundamental-mode optical signal, that is, the first transmission optical waveguide 320 is a single-mode waveguide; or at least one of the first coupling region 321 or the first input/output region 322 transmits an optical signal that is in another mode. This is not limited in this embodiment of the present invention.

Figure 6:
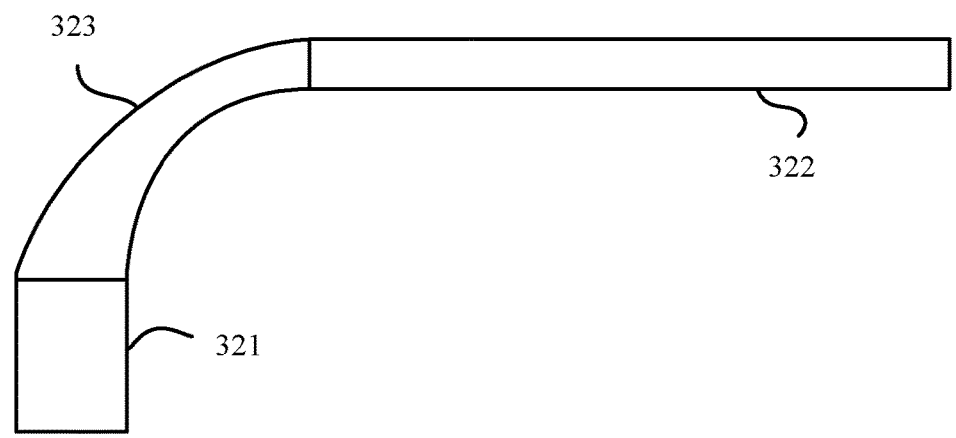
FIG. 6 is a top view of a first transmission optical waveguide according to an embodiment of the present invention.

Optionally, in another embodiment, as shown in FIG. 6, a width of the first coupling region 321 is different from a width of the first input/output region 322.

The first transmission optical waveguide 320 further includes a first transition region 323. Two ends of the first transition region are of different widths, and the two ends of the first transition region are respectively connected to the first input/output region 322 and the first coupling region 321.

The first input/output region 322 and the first coupling region 321 each may have a constant width value. A width of an end, connected to the first input/output region 322, of the first transition region 323 may be equal to the width of the first input/output region 322, and a width of an end connected to the first coupling region 321 may be equal to the width of the first coupling region 321. Specifically, as shown in FIG. 6, the width of the first input/output region 322 may be less than the width of the first coupling region 321, and in this case, the width of the end, connected to the first coupling region 321, of the first transition region 323 is greater than the width of the end connected to the first input/output region 322. Alternatively, the width of the first input/output region 322 may be greater than the width of the first coupling region 321, and in this case, the width of the end, connected to the first coupling region 321, of the first transition region 323 is less than the width of the end connected to the first input/output region 322. This is not limited in this embodiment of the present invention.

Optionally, at least one of the first coupling region 321 or the first input/output region 322 may include a curved part. Optionally, in another embodiment, both the first coupling region 321 and the first input/output region 322 may be straight. In this case, if there is a non-zero included angle between an optical signal transmission direction in the first coupling region 321 and an optical signal transmission direction in the first input/output region 322, for example, 90 degrees, the first transition region 323 may include a curved part, and the curved part may be arc-shaped, a trigonometric curve, a polynomial curve, or an asymptotic curve. This is not limited in this embodiment of the present invention.

Optionally, in another embodiment, as shown in FIG. 6, there is a non-zero included angle between an optical signal transmission direction in the first coupling region 321 and an optical signal transmission direction in the first input/output region 322, and correspondingly, the first transition region 323 includes a curved part.

Figure 7:
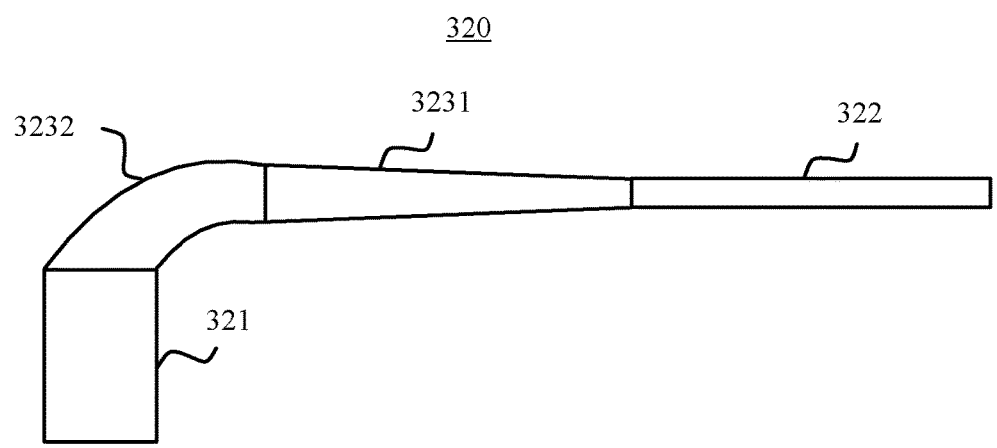
FIG. 7 is another top view of a first transmission optical waveguide according to an embodiment of the present invention.
Figure 8:
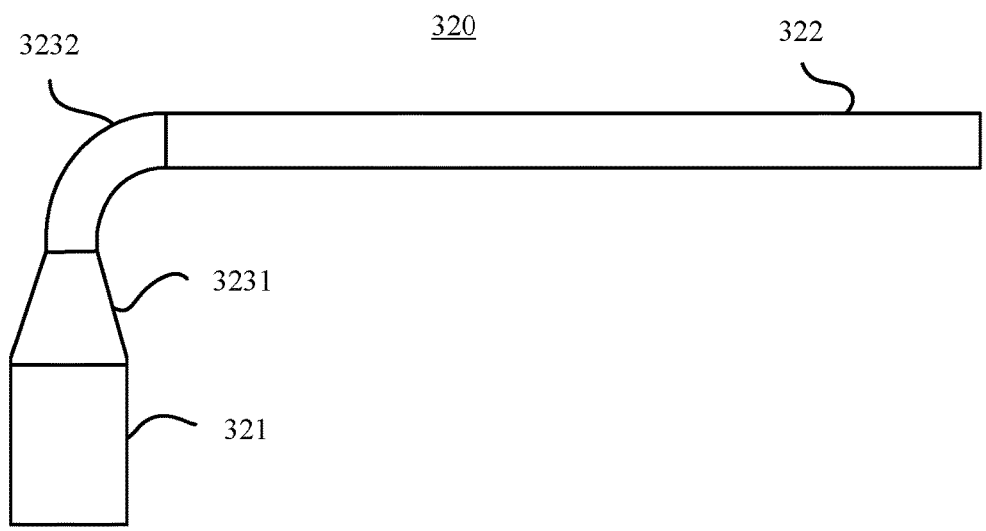
FIG. 8 is still another top view of a first transmission optical waveguide according to an embodiment of the present invention.

Optionally, as shown in FIG. 6, two ends of the curved part are of different widths, that is, the first transition region 323 is specifically a curved optical waveguide with a gradually changing width, and the width of the curved optical waveguide gradually increases in a direction approaching the first coupling region 321. Alternatively, as shown in FIG. 7 and FIG. 8, the first transition region 323 includes a tapered part 3231 and a curved part 3232. The curved part 3232 has a constant width value, and the tapered part 3231 is straight, that is, an optical signal transmission direction is constant. Specifically, in FIG. 7, the first coupling region 321, the curved part 3232, the tapered part 3231, and the first input/output region 322 are successively connected, and are disposed successively in a direction away from the multi-mode optical waveguide 310. An optical signal transmission direction in the tapered part 3231 is parallel to an optical signal transmission direction in the first input/output region 322, and a width of the tapered part 3231 gradually increases in a direction away from the first input/output region 322. In this case, in the mode multiplexer/demultiplexer provided in this embodiment of the present invention, the multi-mode optical waveguide 310 is of a fixed width, and therefore, in a length direction of the multi-mode optical waveguide 310, no extra tapered optical waveguide is required for connecting two parts of different widths in the multi-mode optical waveguide, so as to reduce an overall length of the mode division multiplexer/demultiplexer 300.

In FIG. 8, the first coupling region 321, the tapered part 3231, the curved part 3232, and the first input/output region 322 are successively connected, and are disposed successively in a direction away from the multi-mode optical waveguide 310. An optical signal transmission direction in the tapered part 3231 is parallel to an optical signal transmission direction in the first coupling region 321, and a width of the tapered part 3231 gradually increases in a direction approaching the first coupling region 321. A shape and a structure of the first transition region 323 are not limited in this embodiment of the present invention.

In this case, a width of the second coupling region 331 may be the same as or different from a width of the second input/output region 332. This is not limited in this embodiment of the present invention. When the second coupling region 331 and the second input/output region 332 are of same widths, the second coupling region 331 may be directly connected to the second input/output region 332, and in this case, at least one of the second coupling region 331 or the second input/output region 332 may include a curved part. If both an optical signal transmission direction in the second coupling region 331 and the second input/output region 332 are straight, and there is a non-zero included angle between the optical signal transmission direction in the second coupling region 331 and an optical signal transmission direction in the second input/output region 332, the second coupling region 331 and the second input/output region 332 may be connected by using a curved region. This is not limited in this embodiment of the present invention.

Similarly, there is a channel used for transmitting a fundamental-mode optical signal between the second coupling region 331 and the second input/output region 332, so that the second coupling region 331 transmits a fundamental-mode optical signal to the second input/output region 332, and the second input/output region 332 transmits a fundamental-mode optical signal to the second coupling region 331. Specifically, the second coupling region 331 may be neighboring to the second input/output region 332, and in this case, the second coupling region 331 is directly connected to the second input/output region 332. Alternatively, the second coupling region 331 may be not neighboring to the second input/output region 332, and in this case, the second coupling region 331 is indirectly connected to the second input/output region 332 by using another region. This is not limited in this embodiment of the present invention. Optionally, the second coupling region 331 and the second input/output region 332 transmits only a fundamental-mode optical signal, that is, the second transmission optical waveguide 330 is a single-mode waveguide; or at least one of the second coupling region 331 or the second input/output region 332 transmits an optical signal that is in another mode. This is not limited in this embodiment of the present invention.

If the width of the second coupling region 331 is different from the width of the second input/output region 332, the second transmission optical waveguide 330 further includes: a second transition region. Two ends of the second transition region are of different widths, and the two ends of the second transition region are respectively connected to the second input/output region 332 and the second coupling region 331. In this case, the width of the first coupling region 321 may be the same as or different from the width of the first input/output region 322. This is not limited in this embodiment of the present invention.

A width of an end, connected to the second input/output region 332, of the second transition region may be equal to the width of the second input/output region 332, and a width of an end connected to the second coupling region 331 may be equal to the width of the second coupling region 331. Specifically, the width of the second input/output region 332 may be less than the width of the second coupling region 331, and in this case, the width of the end, connected to the second coupling region 331, of the second transition region is greater than the width of the end connected to the second input/output region 332. Alternatively, the width of the second input/output region 332 may be greater than the width of the second coupling region 331, and in this case, the width of the end, connected to the second coupling region 331, of the second transition region is less than the width of the end connected to the second input/output region 332. This is not limited in this embodiment of the present invention.

Optionally, the second input/output region 332 and the second coupling region 331 each may have a constant width value. A width of an end, connected to the second input/output region 332, of the second transition region may be equal to the width of the second input/output region 332, and a width of an end connected to the second coupling region 331 may be equal to the width of the second coupling region 331. Specifically, the width of the second input/output region 332 may be less than the width of the second coupling region 331, and in this case, the width of the end, connected to the second coupling region 331, of the second transition region is greater than the width of the end connected to the second input/output region 332. Alternatively, the width of the second input/output region 332 may be greater than the width of the first coupling region 331, and in this case, the width of the end, connected to the second coupling region 331, of the second transition region is less than the width of the end connected to the second input/output region 332. This is not limited in this embodiment of the present invention.

Optionally, at least one of the second coupling region 331 or the second input/output region 332 may include a curved part. Optionally, in another embodiment, both the second coupling region 331 and the second input/output region 332 may be straight. In this case, if there is a non-zero included angle between an optical signal transmission direction in the second coupling region 331 and an optical signal transmission direction in the second input/output region 332, for example, 90 degrees, the second transition region may include a curved part, and the curved part may be arc-shaped, a trigonometric curve, a polynomial curve, or an asymptotic curve. This is not limited in this embodiment of the present invention.

Optionally, in another embodiment, there is a non-zero included angle between an optical signal transmission direction in the second coupling region 331 and an optical signal transmission direction in the second input/output region 332, and correspondingly, the second transition region includes a curved part.

Optionally, two ends of the curved part are of different widths, that is, the second transition region is specifically a curved optical waveguide with a gradually changing width, and the width of the curved optical waveguide gradually increases in a direction approaching the second coupling region 331. Alternatively, the second transition region includes a tapered part and a curved part. The curved part has a constant width value, and the tapered part is straight, that is, an optical signal transmission direction is constant. For a specific disposing manner, refer to the foregoing description of the first transition region 323, and details are not described herein.

Optionally, in another embodiment, the multi-mode optical waveguide 310 may have a constant width value.

The width value of the multi-mode optical waveguide 310 may be 0.4 µm~10 µm. However, this is not limited in this embodiment of the present invention. Optionally, in another embodiment, a width of the multi-mode optical waveguide 310 may not be constant. For example, the multi-mode optical waveguide 310 is a tapered optical waveguide. However, this embodiment of the present invention is not limited thereto.

Optionally, in another embodiment, both the first coupling region 321 and the second coupling region 331 are parallel to the multi-mode optical waveguide 310, and both a distance between the first coupling region 321 and the multi-mode optical waveguide 310 and a distance between the second coupling region 331 and the multi-mode optical waveguide 310 are less than 1 µm.

Optionally, in another embodiment, when the mode multiplexer/demultiplexer 300 implements mode division multiplexing, the first input/output region 322 is configured to receive a fundamental-mode optical signal from a first transmit end, and transmit the received fundamental-mode optical signal to the first coupling region 321. The first coupling region 321 is configured to couple, to the first mode channel, the fundamental-mode optical signal transmitted by the first input/output region 322. The second input/output region 332 is configured to receive a fundamental-mode optical signal from a second transmit end, and transmit the received fundamental-mode optical signal to the second coupling region 331. The second coupling region 331 is configured to couple, to the second mode channel, the fundamental-mode optical signal transmitted by the second input/output region 332. The multi-mode optical waveguide 310 is configured to perform optical mode coupling with the first coupling region 321 to obtain the first-mode optical signal transmitted by the first mode channel, perform optical mode coupling with the second coupling region 331 to obtain the second-mode optical signal transmitted by the second mode channel, and transmit, to a first receive end, the first-mode optical signal and the second-mode optical signal that are obtained by means of coupling.

The first transmit end may be the same as or different from the second transmit end. This is not limited in this embodiment of the present invention. Both the two fundamental-mode optical signals transmitted in the first transmission optical waveguide 320 and the second transmission optical waveguide 330 are coupled to the multi-mode optical waveguide 310 for transmission, so as to implement mode division multiplexing of the optical signals.

Optionally, in another embodiment, when the mode multiplexer/demultiplexer 300 implements mode division demultiplexing, the multi-mode optical waveguide 310 is configured to receive an optical signal from a third transmit end, where the optical signal includes the first-mode optical signal and the second-mode optical signal; couple the first-mode optical signal to the first fundamental-mode channel in the first coupling region 321; and couple the second-mode optical signal to the second fundamental-mode channel in the second coupling region 331. The first coupling region 321 is configured to obtain, by performing optical mode coupling with the multi-mode optical waveguide 310, the fundamental-mode optical signal transmitted by the first fundamental-mode channel, and transmit, to the first input/output region 322, the fundamental-mode optical signal obtained by means of coupling. The first input/output region 322 is configured to transmit, to a second receive end, the fundamental-mode optical signal transmitted by the first coupling region 321. The second coupling region 331 is configured to obtain, by performing optical mode coupling with the multi-mode optical waveguide 310, the fundamental-mode optical signal transmitted by the second fundamental-mode channel, and transmit, to the second input/output region 332, the fundamental-mode optical signal obtained by means of coupling. The second input/output region 332 is configured to transmit, to a third receive end, the fundamental-mode optical signal transmitted by the second coupling region 331.

In this case, the second receive end may be the same as or different from the third receive end. This is not limited in this embodiment of the present invention. The first-mode optical signal and the second-mode optical signal that are transmitted in the multi-mode optical waveguide 310 are respectively coupled to the first transmission optical waveguide 320 and the second transmission optical waveguide 330 for transmission, so as to implement mode division demultiplexing of the optical signals.

Therefore, the mode multiplexer/demultiplexer 300 according to this embodiment of the present invention includes a multi-mode optical waveguide, a first transmission optical waveguide, and a second transmission optical waveguide. The first transmission optical waveguide and the second transmission optical waveguide respectively include a first coupling region and a second coupling region. Both the first coupling region and the second coupling region transmits a fundamental-mode optical signal, and an effective refractive index of a fundamental-mode optical signal in the first coupling region is different from an effective refractive index of the same fundamental-mode optical signal in the second coupling region. In this way, the first transmission optical waveguide and the second transmission optical waveguide can respectively meet a mode match condition with and perform optical mode coupling with channels that are in different modes in the multi-mode optical waveguide, and can couple fundamental-mode optical signals transmitted in the first transmission optical waveguide and the second transmission optical waveguide as two optical signals that are in different modes in the multi-mode optical waveguide, or respectively couple two optical signals that are in different modes and transmitted in the multi-mode optical waveguide as fundamental-mode optical signals in the first transmission optical waveguide and the second transmission optical waveguide, so as to implement mode division multiplexing or demultiplexing in an optical network-on-chip system.

In addition, the first coupling region and the second coupling region are of different widths, so that the first transmission optical waveguide and the second transmission optical waveguide respectively perform optical mode coupling with channels that are in different modes in the multi-mode optical waveguide. Therefore, a problem of introducing an extra tapered optical waveguide for changing a width of a multi-mode optical waveguide in the prior art is avoided, and an overall length of the mode multiplexer/demultiplexer is reduced. In addition, because a coupling region that is of a transmission optical waveguide and that performs optical mode coupling with a high-order mode in the multi-mode optical waveguide is relatively wide, a fundamental-mode optical signal has a relatively small effective refractive index in the coupling region. Therefore, lengths of the multi-mode optical waveguide and the coupling part can be reduced, and the overall length of the mode multiplexer/demultiplexer is further reduced. An overall volume of the mode multiplexer/demultiplexer provided in this embodiment of the present invention is relatively small. Therefore, the mode multiplexer/demultiplexer can be used for multiplexing and transmission of optical signals that are in more modes, and has better expansibility.

Figure 9:
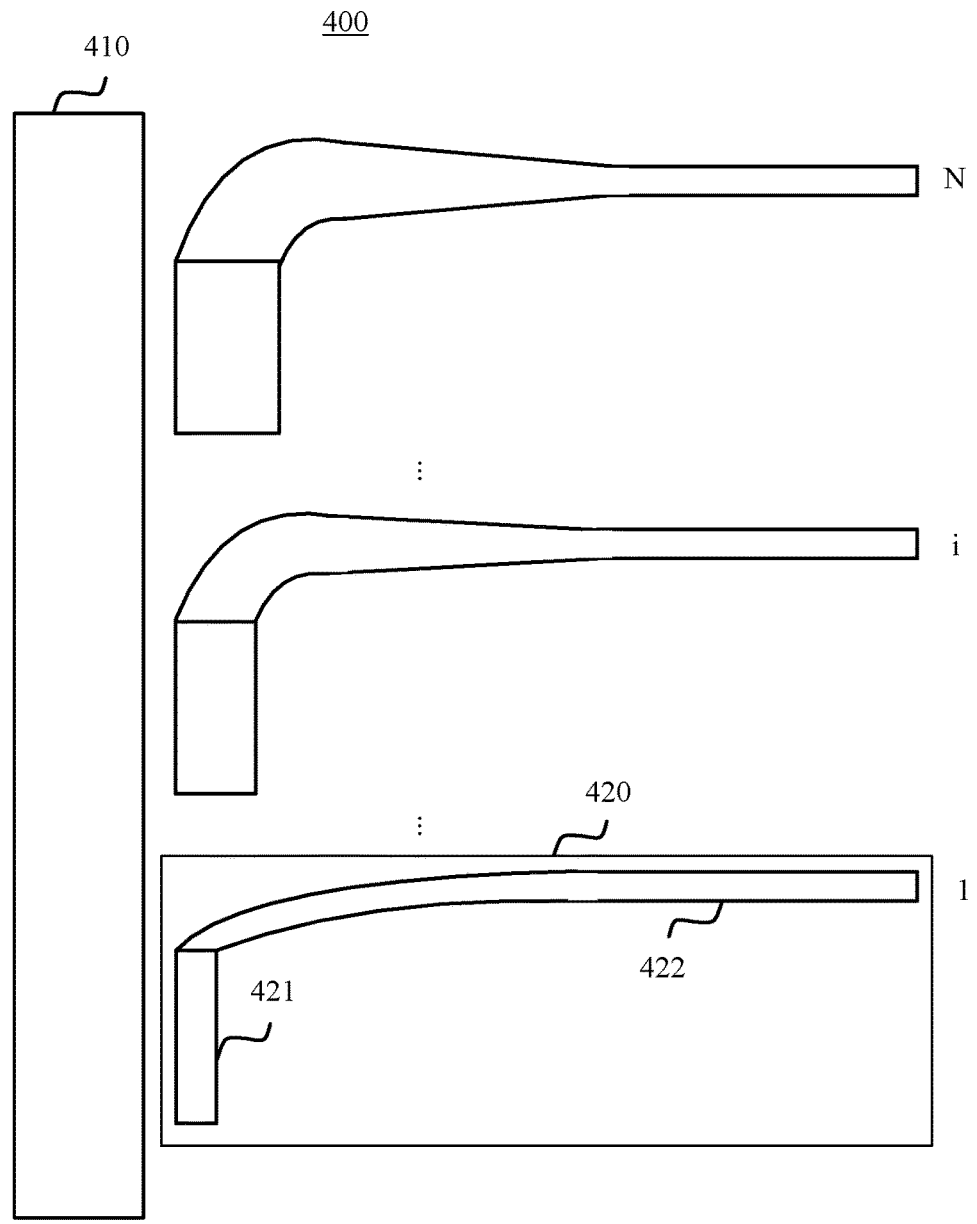
FIG. 9 is top view of another mode multiplexer/demultiplexer according to an embodiment of the present invention.

The following describes a mode multiplexer/demultiplexer according to an embodiment of the present invention in detail by using a specific example. FIG. 9 schematically shows a mode multiplexer/demultiplexer 400 according to another embodiment of the present invention. The mode multiplexer/demultiplexer 400 includes: a multi-mode optical waveguide 410, and N transmission optical waveguides 420 (a transmission optical waveguide 1, . . . , a transmission optical waveguide i, . . . , and a transmission optical waveguide N), where N≥2.

The multi-mode optical waveguide 410 includes N mode channels, and the N mode channels are in one-to-one correspondence with optical signals that are in N different modes.

Each of the N transmission optical waveguides 420 includes a coupling region 421 and an input/output region 422. A fundamental-mode optical signal can be transmitted between a coupling region 421 and an input/output region 422 that are of one transmission optical waveguide.

The coupling regions 421 of the N transmission optical waveguides 420 are configured to perform optical mode coupling with the N mode channels in the multi-mode optical waveguide 410, and a fundamental-mode optical signal has different effective refractive indexes in coupling regions of any two of the N transmission optical waveguides 420.

Specifically, a coupling region of the $i^{th}$ transmission optical waveguide is configured to perform optical mode coupling with the $i^{th}$ mode channel in the multi-mode optical waveguide, where 1≤i≤N.

Therefore, the mode multiplexer/demultiplexer 400 according to this embodiment of the present invention includes a multi-mode optical waveguide and N transmission optical waveguides. Each transmission optical waveguide includes an input/output region and a coupling region that is configured to perform optical mode coupling with the multi-mode optical waveguide, and coupling regions of the N transmission optical waveguides are of mutually different widths, so that a fundamental-mode optical signal has mutually different effective refractive indexes in the N transmission optical waveguides. In this way, the N transmission optical waveguides can respectively meet a mode match condition with and perform optical mode coupling with channels that are in different modes in the multi-mode optical waveguide. Therefore, fundamental-mode optical signals transmitted in the N transmission optical waveguides can be coupled as optical signals that are in N different modes in the multi-mode optical waveguide, or optical signals that are in N different modes and transmitted in the multi-mode optical waveguide can be coupled as fundamental-mode optical signals in the N transmission optical waveguides, so as to implement mode division multiplexing or demultiplexing in an optical network-on-chip system.

The multi-mode optical waveguide may have M mode channels. Each mode channel is configured to transmit an optical signal that is in one mode, modes of optical signals transmitted on the mode channels are mutually different, and M≥N. Optical signals that are in N different modes and corresponding to the N mode channels may be specifically N optical signals with consecutive mode orders. For example, the optical signals in the N modes include an optical signal in a zero-order mode (that is, a fundamental mode) to an optical signal in an (N−1)-order mode, or include an optical signal in a one-order mode to an optical signal in an N-order mode. Alternatively, the optical signals in the N different modes may be N optical signals with inconsecutive mode orders. This is not limited in this embodiment of the present invention.

In an optional embodiment, the multi-mode optical waveguide and the N transmission optical waveguides may be disposed on one substrate, and the substrate may be a silicon substrate or another semiconductor substrate. This is not limited in this embodiment of the present invention. Optionally, the multi-mode optical waveguide and the N transmission optical waveguides may be of same heights, or the N transmission optical waveguides may be of different heights. This is not limited in this embodiment of the present invention.

Coupling regions of the N transmission optical waveguides respectively perform optical mode coupling with the N mode channels in the multi-mode optical waveguide. Specifically, a coupling region of the $i^{th}$ transmission optical waveguide performs optical mode coupling with the $i^{th}$ mode channel in the multi-mode optical waveguide. Configuration of the N transmission optical waveguides may meet a preset condition, so that the fundamental-mode optical signal has different effective refractive indexes in any two of the N transmission optical waveguides. The preset condition may include at least one of the following conditions:

at least two coupling regions included in the N transmission optical waveguides are of different widths;

at least two of the N transmission optical waveguides are of different heights; or at least two of the N transmission optical waveguides are made from different materials.

In an optional embodiment, at least two coupling regions included in the N transmission optical waveguides are of different widths.

Optionally, in this embodiment of the present invention, a coupling region and an input/output region of one transmission optical waveguide may be directly or indirectly connected. Specifically, if a coupling region of a transmission optical waveguide and an input/output region of the transmission optical waveguide are of same widths, the coupling partand the input/output region of the transmission optical waveguide may be directly connected. In this case, one end, connected to the coupling region, of the input/output region of the transmission optical waveguide may include a curved part, and the curved part has a single width value. However, this is not limited in this embodiment of the present invention.

Optionally, in another embodiment, if a coupling region of a transmission optical waveguide and an input/output region of the transmission optical waveguide are of different widths, the transmission optical waveguide may further include a transition region. Two ends of the transition region are of different widths, and the two ends of the transition region of the transmission optical waveguide are respectively connected to the input/output region and the coupling part of the transmission optical waveguide.

Optionally, in another embodiment, all coupling regions of the N transmission optical waveguides may be parallel to the multi-mode optical waveguide, and distances between the coupling regions of the N transmission optical waveguides and the multi-mode optical waveguide are less than or equal to a wavelength of an optical signal in the vacuum, so as to meet an evanescent field coupling condition. Optionally, the distances between the coupling regions of the N transmission optical waveguides and the multi-mode optical waveguide may be the same. However, this embodiment of the present invention is not limited thereto.

In addition, lengths of the coupling regions of the N transmission optical waveguides may be large enough, so that coupling efficiency of optical mode coupling between the N transmission optical waveguides and the multi-mode optical waveguide is relatively high. For example, the coupling regions of the N transmission optical waveguides may be 10 μm to 100 μm in length, and may be 0.4 μm to 10 μm in width. However, this is not limited in this embodiment of the present invention.

In the mode multiplexer/demultiplexer 400, disposing of the multi-mode optical waveguide and the N transmission optical waveguides may enable the N transmission optical waveguides to respectively meet the mode match condition with the channels that are in different modes in the multi-mode optical waveguide. Specifically, assuming that the $j^{th}$ mode channel in the multi-mode optical waveguide is corresponding to an optical signal that is in the $j^{th}$ mode in the N different modes, a coupling region of the $i^{th}$ transmission optical waveguide in the N transmission optical waveguides may meet the mode match condition with the $j^{th}$ mode channel in the multi-mode optical waveguide, where 1≤i, and j≤N. That is, an effective refractive index of the optical signal in the $j^{th}$ mode on the $j^{th}$ mode channel is equal or similar to an effective refractive index of a fundamental-mode optical signal in a coupling region of the $i^{th}$ transmission optical waveguide. In this way, the fundamental-mode optical signal transmitted in the coupling part of the $i^{th}$ transmission optical waveguide may be coupled to the $j^{th}$ mode channel in the multi-mode optical waveguide for transmission, or the optical signal in the $j^{th}$ mode transmitted in the multi-mode optical waveguide may be coupled to the coupling part of the $i^{th}$ transmission optical waveguide and may be transmitted as a fundamental-mode optical signal.

Each of the N transmission optical waveguides is configured to transmit a fundamental-mode optical signal, and each of the transmission optical waveguides includes a coupling region and an input/output region. A coupling region and an input/output region of a transmission optical waveguide may include only a fundamental-mode channel. For example, the transmission optical waveguide is a single-mode optical waveguide. Alternatively, at least one of a coupling region or an input/output region further includes a high-order-mode channel configured to transmit a high-order-mode optical signal. This is not limited in this embodiment of the present invention.

Optionally, in another embodiment, when the mode multiplexer/demultiplexer 400 is used as a mode multiplexer, an input/output region of the $i^{th}$ transmission optical waveguide in the N transmission optical waveguides is configured to receive a fundamental-mode optical signal from a first transmit end, and transmit the fundamental-mode optical signal to a coupling region of the $i^{th}$ transmission optical waveguide, where 1≤i≤N; the coupling part of the $i^{th}$ transmission optical waveguide is configured to couple the received fundamental-mode optical signal to the $i^{th}$ mode channel in the multi-mode optical waveguide; and the multi-mode optical waveguide is configured to perform optical mode coupling with the coupling regions of the N transmission optical waveguides to obtain the optical signals that are in the N different modes and corresponding to the N mode channels, and transmit the optical signals that are in the N different modes to a first receive end.

In the foregoing transmission and mode coupling process, a polarization state of an optical signal may remain unchanged. In this way, the mode multiplexer/demultiplexer 400 may couple N fundamental-mode optical signals transmitted in the N transmission optical waveguides as the optical signals that are in the N different modes in the multi-mode optical waveguide, so as to implement mode division of the optical signals and transmit the optical signals.

Optionally, in another embodiment, when the mode multiplexer/demultiplexer 400 is used as a mode demultiplexer, the multi-mode optical waveguide is configured to receive an optical signal from a second transmit end, where the optical signal includes the optical signals that are in the N different modes and corresponding to the N channel modes; and couple the optical signals that are in the N different modes to the coupling regions of the N transmission optical waveguides;

a coupling region of the $i^{th}$ transmission optical waveguide in the N transmission optical waveguides is configured to couple, as a fundamental-mode optical signal, an optical signal that is in the $i^{th}$ mode and transmitted in the multi-mode optical waveguide; and transmit, to an input/output region of the $i^{th}$ transmission optical waveguide, the fundamental-mode optical signal obtained by means of coupling, where 1≤i≤N; and the input/output region of the $i^{th}$ transmission optical waveguide is specifically configured to transmit the received fundamental-mode optical signal to a second receive end.

In the foregoing transmission and mode coupling process, a polarization state of an optical signal may remain unchanged. In this way, the mode multiplexer/demultiplexer may couple, to the N transmission optical waveguides, the optical signals that are in the N different modes and transmitted in the multi-mode optical waveguide, and the optical signals in the N different modes are transmitted as fundamental-mode optical signals, so as to implement mode division demultiplexing of the optical signals.

Figure 10:
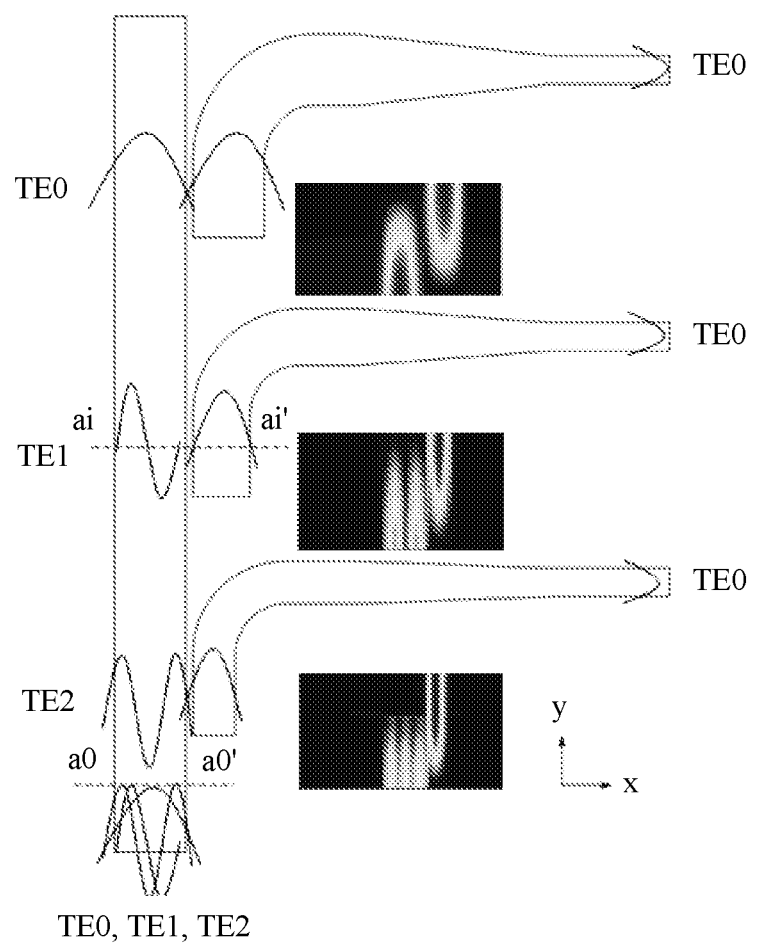
FIG. 10 is an optical energy distribution diagram of an example of a mode multiplexer/demultiplexer during mode division multiplexing according to an embodiment of the present invention.

In an example of a mode multiplexer/demultiplexer disposed on a silicon substrate, the mode multiplexer/demultiplexer includes a multi-mode optical waveguide and three input optical waveguides, and each of the three input optical waveguides includes a coupling region, a curved region, a tapered region, and an input/output region that are disposed successively. Specifically, the waveguides included in the mode multiplexer/demultiplexer are of same heights h, where h=220 nm. A width of the multi-mode optical waveguide is $W_b$=1.6 μm, and distances D between coupling regions of the three input optical waveguides and the multi-mode optical waveguide are the same, where D=100 nm. Widths of the coupling regions of the three input optical waveguides are respectively $W_1$=1.6 μm, $W_2$=0.8 μm, and $W_3$=0.5 μm, and widths of input/output regions of the three input optical waveguides each are 500 nm. FIG. 10 shows optical energy distribution curves of the example of the mode multiplexer/demultiplexer during mode division multiplexing. The optical energy distribution diagram has a black background, and the optical energy distribution diagram includes multiple U-shaped (or similarly U-shaped)

energy distribution curves. A downward U-shaped curve on the left side indicates an optical energy distribution curve corresponding to one mode channel in the multi-mode optical waveguide, and an upward U-shaped curve on the right side indicates an optical energy distribution curve corresponding to a transmission optical waveguide. In addition, a separate U-shaped curve is corresponding to a mode TE0, two parallel U-shaped curves with a same opening direction are corresponding to a mode TE1, and three parallel U-shaped curves with a same opening direction are corresponding to a mode TE2. It may be learned from FIG. 10 that the three transmission optical waveguides respectively perform optical mode coupling with the mode TE0, the mode TE1, and the mode TE2 that are in the multi-mode optical waveguide.

Therefore, the mode multiplexer/demultiplexer according to this embodiment of the present invention includes a multi-mode optical waveguide and N transmission optical waveguides. Each transmission optical waveguide includes an input/output region and a coupling region that is configured to perform optical mode coupling with the multi-mode optical waveguide, and coupling regions of the N transmission optical waveguides are of mutually different widths, so that a fundamental-mode optical signal has mutually different effective refractive indexes in the N transmission optical waveguides. In this way, the N transmission optical waveguides can respectively meet a mode match condition with and perform optical mode coupling with channels that are in different modes in the multi-mode optical waveguide. Therefore, fundamental-mode optical signals transmitted in the N transmission optical waveguides can be coupled as optical signals that are in N different modes in the multi-mode optical waveguide, or optical signals that are in N different modes and transmitted in the multi-mode optical waveguide can be coupled as fundamental-mode optical signals in the N transmission optical waveguides, so as to implement mode division multiplexing or demultiplexing in an optical network-on-chip system.

In addition, the coupling regions of the N transmission optical waveguides are of mutually different widths, so that the N transmission optical waveguides performs optical mode coupling with channels that are in different modes in the multi-mode optical waveguide. Therefore, a problem of introducing an extra tapered optical waveguide for changing a width of a multi-mode optical waveguide in the prior art is avoided, and an overall length of the mode multiplexer/demultiplexer is reduced. In addition, because a coupling region that is of a transmission optical waveguide and that performs mode coupling with a high-order-mode optical signal in the multi-mode optical waveguide is relatively wide, a fundamental-mode optical signal has a relatively small effective refractive index in the coupling region. Therefore, lengths of the multi-mode optical waveguide and the coupling part can be reduced, and the overall length of the mode multiplexer/demultiplexer is further reduced. An overall volume of the mode multiplexer/demultiplexer provided in this embodiment of the present invention is relatively small. Therefore, the mode multiplexer/demultiplexer can be used for multiplexing and transmission of optical signals that are in more modes, and has better expansibility.

The mode multiplexer/demultiplexer according to the embodiments of the present invention is described above in detail with reference to FIG. 3 to FIG. 10, and a switching node according to embodiments of the present invention is described in the following with reference to FIG. 11 to FIG. 14. The switching node transmits an optical signal by using both a wavelength division multiplexing (Wavelength Division Multiplexing, WDM) technology and a mode division multiplexing technology. It should be understood that, the embodiment of the present invention is described by using an example in which the switching node transmits an optical signal by combining the wavelength division multiplexing technology with the mode division multiplexing technology. The switching node may transmit an optical signal by using the mode division multiplexing technology and at least one of a polarization division multiplexing (PDM) technology, a time division multiplexing (TDM), technology or a wavelength division multiplexing technology. This is not limited in the embodiments of the present invention.

Figure 11:
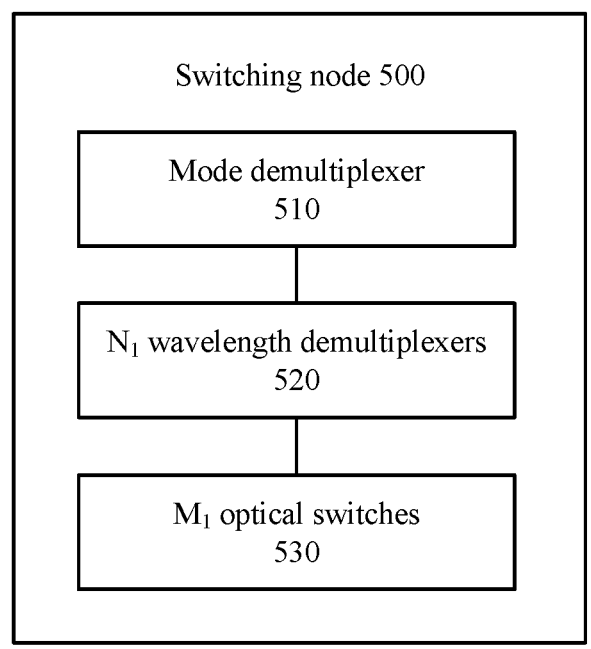
FIG. 11 is a schematic block diagram of a switching node according to an embodiment of the present invention.

FIG. 11 shows a schematic block diagram of a switching node 500 according to an embodiment of the present invention. The switching node 500 performs wavelength division multiplexing on multiple optical signals that are in one mode and that have different wavelengths, and performs mode division multiplexing on multiple optical signals that are in different modes and that separately include multiple wavelengths. However, this embodiment of the present invention is not limited thereto. As shown in FIG. 11, the switching node 500 includes:

one mode demultiplexer 510, $N_1$ wavelength demultiplexers 520, and $M_1$ optical switches 530, where the mode demultiplexer 510 is any mode multiplexer/demultiplexer shown in FIG. 3 to FIG. 10, $1 < N_1 \le N$, and $M_1$ is an integer greater than 1.

Specifically, the mode demultiplexer 510 is configured to receive an optical signal, where the optical signal includes optical signals that are in $N_2$ modes and that have $M_2$ wavelengths, $M_2 \le M_1$, and $1 < N_2 \le N_1$.

The mode demultiplexer 510 is further configured to: split the optical signal into $N_2$ fundamental-mode optical signals, and transmit the $N_2$ fundamental-mode optical signals to the $N_1$ wavelength demultiplexers 520, where each of the $N_2$ fundamental-mode optical signals is an optical signal with at least one wavelength.

A first wavelength demultiplexer in the $N_1$ wavelength demultiplexers 520 is configured to receive a fundamental-mode optical signal that is transmitted by the mode demultiplexer 510 and that includes $M_2$ wavelengths, split the received fundamental-mode optical signal into $M_2$ fundamental-mode optical signals, and transmit, to the $M_1$ optical switches 530, the obtained $M_2$ fundamental-mode optical signals, where each of the $M_2$ fundamental-mode optical signals has a single wavelength, and wavelengths of the $M_2$ fundamental-mode optical signals are mutually different.

A first optical switch in the $M_1$ optical switches 530 is configured to receive at least one fundamental-mode optical signal that is transmitted by the $N_1$ wavelength demultiplexers 520 and that has a single wavelength, and route the at least one fundamental-mode optical signal according to a destination node of the received at least one fundamental-mode optical signal.

Therefore, the switching node according to this embodiment of the present invention includes a mode demultiplexer, multiple wavelength demultiplexers, and multiple optical switches, can successively perform mode division demultiplexing and wavelength division demultiplexing on an optical signal that includes multiple wavelengths and multiple modes to obtain multiple fundamental-mode optical signals each having a single wavelength, and can route the multiple fundamental-mode optical signals each having a single wavelength by using the multiple optical switches, so as to transmit an optical signal by using a wavelength division multiplexing technology and a mode division multiplexing technology.

The mode demultiplexer 510 performs mode division demultiplexing processing on optical signals that are in N modes. The N modes may include the $N_1$ modes, and $N \geq N_1$. Similarly, the wavelength demultiplexer 520 performs wavelength division demultiplexing processing on optical signals with M wavelengths, that is, the wavelength demultiplexer 520 may have M output ports. The M wavelengths include the $M_2$ wavelengths, and $M \geq M_2$.

Each of the $N_1$ fundamental-mode optical signals may include at least one wavelength, for example, may include a fundamental-mode optical signal with one wavelength, or a fundamental-mode optical signal with $M_2$ wavelengths. This is not limited in this embodiment of the present invention.

Differences between the $M_2$ wavelengths may be less than a specific threshold, so as to ensure that the fundamental-mode optical signal with the $M_2$ wavelengths has equal or similar effective refractive indexes in one optical waveguide.

At least one of the $N_1$ wavelength demultiplexers 520 receives a fundamental-mode optical signal transmitted by the mode demultiplexer 510, and each of the at least one wavelength demultiplexer receives a fundamental-mode optical signal including one or more wavelengths. However, this is not limited in this embodiment of the present invention.

At least one of the $M_1$ optical switches 530 receives multiple fundamental-mode optical signals transmitted by the $N_1$ wavelength demultiplexers 520. Each of the at least one optical switch receives at least one fundamental-mode optical signal. However, this is not limited in this embodiment of the present invention.

Each of the $M_1$ optical switches 530 may route the received optical signal according to a destination node of the received optical signal. Specifically, if a destination node of an optical signal received by an optical switch is the switching node 500, the optical switch may output the received optical signal from an output port corresponding to the switching node 500, so that the optical signal is transmitted to the switching node 500. If the destination node of the optical signal received by the optical switch is another switching node, the optical switch may output the received optical signal from an output port corresponding to the another switching node, so that the optical signal is transmitted to the another switching node. This is not limited in this embodiment of the present invention.

Optionally, in another embodiment, the switching node 500 further includes at least one receiver 540, and the at least one receiver 540 is configured to receive at least one fundamental-mode optical signal.

Figure 12:
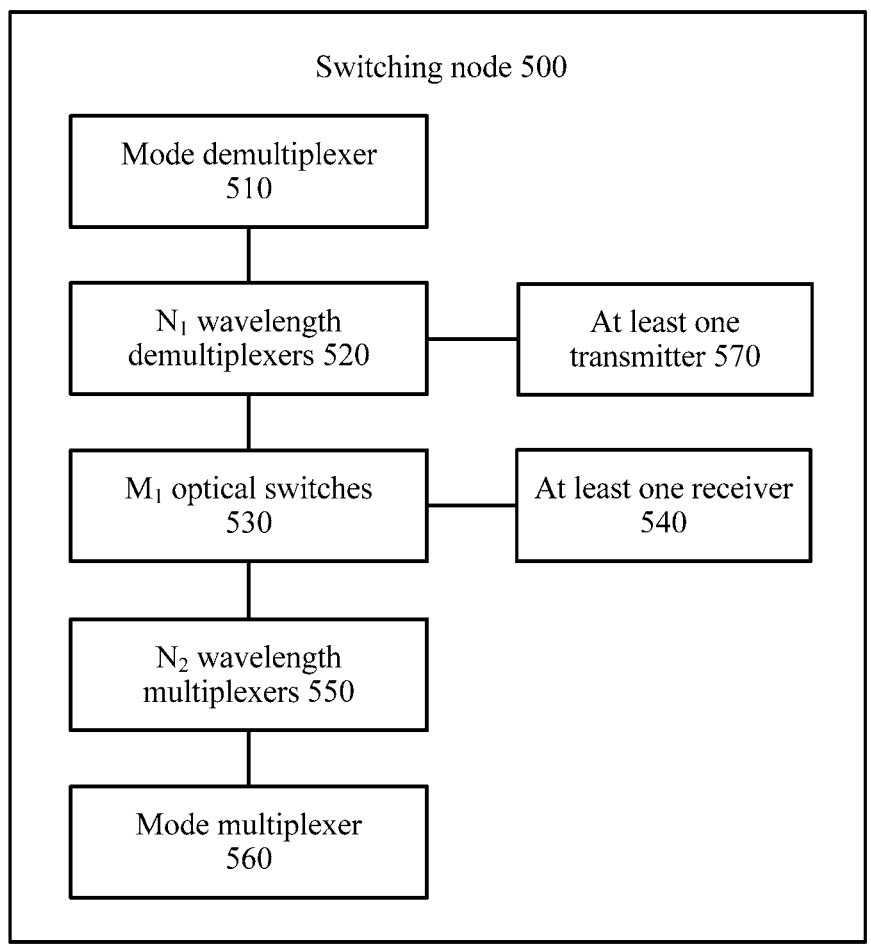
FIG. 12 is another schematic block diagram of a switching node according to an embodiment of the present invention.

Optionally, as shown in FIG. 12, the at least one receiver 540 may be specifically configured to receive fundamental-mode optical signals transmitted by the $M_1$ optical switches. In this case, the first optical switch is specifically configured to: if a destination node of a first fundamental-mode optical signal in the received at least one fundamental-mode optical signal is the switching node 500, transmit the first fundamental-mode optical signal to a receiver in the at least one receiver 540; and correspondingly, a first receiver in the at least one receiver 540 is configured to receive the first fundamental-mode optical signal transmitted by the first optical switch.

Figure 13:
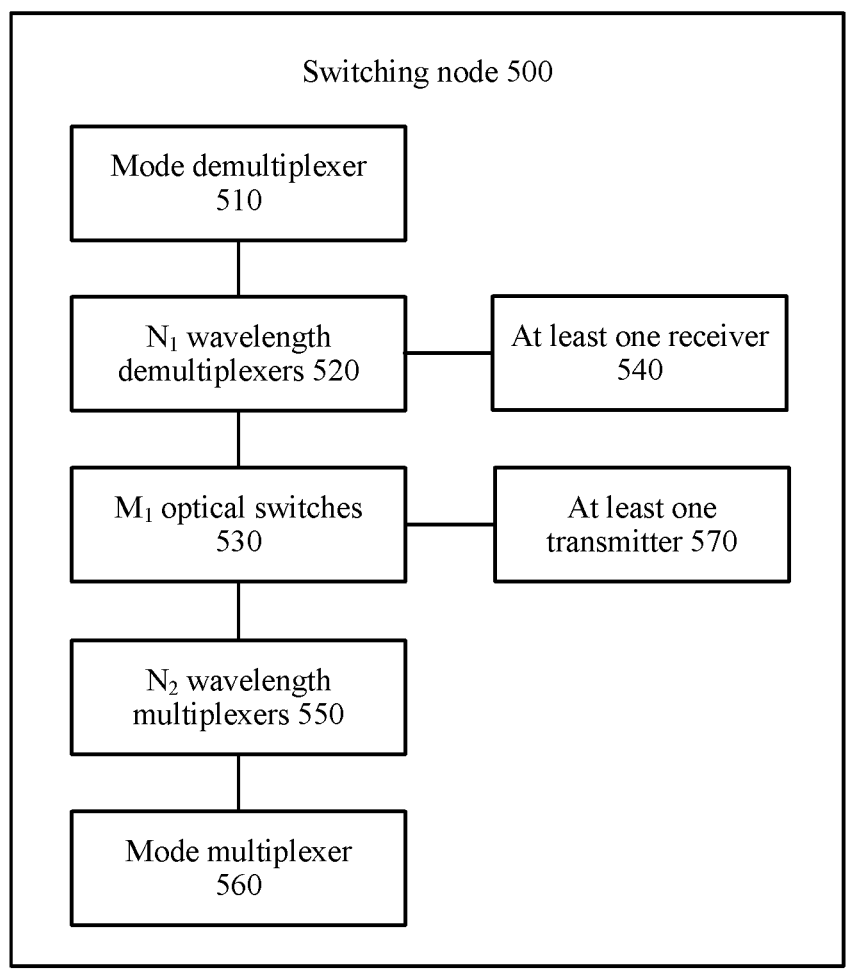
FIG. 13 is still another schematic block diagram of a switching node according to an embodiment of the present invention.

Optionally, in another embodiment, as shown in FIG. 13, the at least one receiver 540 may be specifically configured to receive optical signals transmitted by the $N_1$ wavelength demultiplexers 520. In this case, the at least one receiver 540 may be specifically configured to receive at least one of multiple fundamental-mode optical signals output by the $N_1$ wavelength demultiplexers 520. Correspondingly, all the multiple fundamental-mode optical signals output by the $N_1$ wavelength demultiplexers may be transmitted to the $M_1$ optical switches 530; or some are transmitted to the $M_1$ optical switches 530 and the others are transmitted to the at least one receiver 540. This is not limited in this embodiment of the present invention.

If there are multiple receivers 540, at a specific moment, each of the multiple receivers 540 may receive a fundamental-mode optical signal, or only some of the receivers each receive a fundamental-mode optical signal. This is not limited in this embodiment of the present invention.

Optionally, in another embodiment, as shown in FIG. 12, the switching node 500 further includes:

$N_3$ wavelength multiplexers 550 and a mode multiplexer 560, where the mode multiplexer 560 may be any mode multiplexer/demultiplexer shown in FIG. 3 to FIG. 10, and $N_3$ is an integer greater than 1.

Specifically, the first optical switch is further configured to: if a destination node of a second fundamental-mode optical signal in the received at least one fundamental-mode optical signal is not the switching node, transmit the second fundamental-mode optical signal to a wavelength multiplexer in the $N_3$ wavelength multiplexers.

A first wavelength multiplexer in the $N_3$ wavelength multiplexers 550 is configured to receive multiple fundamental-mode optical signals transmitted by the $M_1$ optical switches 530, multiplex the multiple fundamental-mode optical signals into one fundamental-mode optical signal, and transmit the obtained fundamental-mode optical signal to the mode multiplexer 560, where wavelengths of the multiple fundamental-mode optical signals are mutually different.

The mode multiplexer 560 is configured to receive multiple fundamental-mode optical signals transmitted by the $N_3$ wavelength multiplexers 550, multiplex the multiple fundamental-mode optical signals into one optical signal including multiple different modes, and send the obtained optical signal including the multiple different modes.

A fundamental-mode optical signal received by a wavelength multiplexer in the $N_3$ wavelength multiplexers 550 may be from one or more optical switches. This is not limited in this embodiment of the present invention.

Optionally, the $N_1$ wavelength demultiplexers 520 may form a wavelength demultiplexer array, the $M_1$ optical switches 530 may form an optical switch array, and the $N_3$ wavelength multiplexers 550 may form a wavelength multiplexer array. In this case, the switching node 500 may include the mode demultiplexer 510, the wavelength demultiplexer array 520, the optical switch array 530, the wavelength multiplexer array 550, and the mode demultiplexer 560 that are successively connected.

Optionally, in another embodiment, the switching node 500 further includes at least one transmitter 570, configured to transmit at least one fundamental-mode optical signal, and each of the at least one fundamental-mode optical signal has a single wavelength.

Optionally, as shown in FIG. 12, the at least one transmitter 570 is specifically configured to transmit at least one fundamental-mode optical signal to the $M_1$ optical switches 530, and each of the at least one fundamental-mode optical signal has a single wavelength; and correspondingly, a second optical switch in the $M_1$ optical switches 530 is further configured to receive the at least one fundamental-mode optical signal transmitted by the at least one transmitter 570.

At a specific moment, all of at least one fundamental-mode optical signal received by an optical switch 530 may be from the $N_1$ wavelength demultiplexer 520; or some are from the at least one transmitter 570, and some are from the $N_1$ wavelength demultiplexer 520. This is not limited in this embodiment of the present invention.

Optionally, in another embodiment, as shown in FIG. 13, the at least one transmitter 570 is specifically configured to transmit at least one fundamental-mode optical signal to the $N_3$ wavelength multiplexers 550. Correspondingly, the first wavelength multiplexer is configured to receive multiple fundamental-mode optical signals transmitted by the at least one transmitter and/or the $M_1$ optical switches 530.

If there are multiple transmitters 570, at a specific moment, each of the multiple transmitters 570 may transmit a fundamental-mode optical signal, or only some of the transmitters each transmit fundamental-mode optical signals. This is not limited in this embodiment of the present invention.

Figure 14:
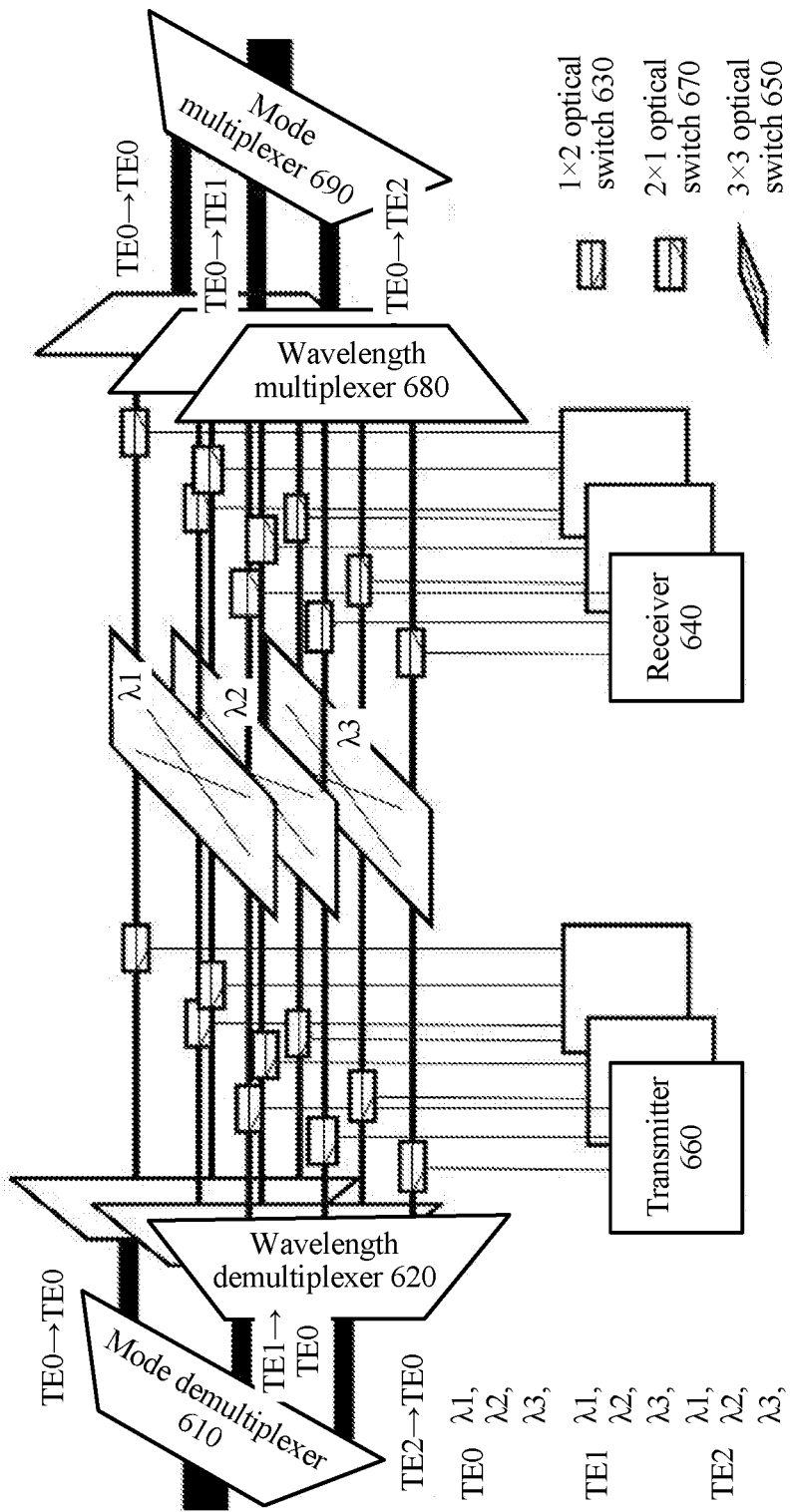
FIG. 14 is a schematic diagram of an example of a switching node according to an embodiment of the present invention.

FIG. 14 shows a schematic diagram of an example of a switching node 600 according to an embodiment of the present invention. As shown in FIG. 14, the switching node 600 includes: a mode demultiplexer 610, a wavelength demultiplexer array including three wavelength demultiplexers 620, a 1×2 optical switch array including nine 1×2 optical switches 630, a receiver array including three receivers 640, a 3×3 optical switch array including three 3×3 optical switches 650, a transmitter array including three transmitters 660, a 2×1 optical switch array including nine 2×1 optical switches 670, a wavelength multiplexer array including three wavelength multiplexers 680, a mode multiplexer 690, and multiple fibers. The mode demultiplexer 610 and the mode multiplexer 690 may be specifically any mode multiplexer/demultiplexer shown in FIG. 3 to FIG. 10.

The mode demultiplexer 610 may be configured to receive an optical signal from an input fiber, and the optical signal includes three wavelengths ($\lambda_1$, $\lambda_2$, and $\lambda_3$) and three modes (TE0, TE1, and TE2). The mode demultiplexer 610 may perform mode division demultiplexing processing on the received optical signal, to obtain three fundamental-mode optical signals. The three fundamental-mode optical signals are respectively from optical signals that are in three modes (TE0, TE1, and TE2), and each of the three fundamental-mode optical signals is an optical signal with three wavelengths. Then, the mode demultiplexer 610 outputs the three fundamental-mode optical signals each including three wavelengths.

The three fundamental-mode optical signals each including three wavelengths may be transmitted to the wavelength demultiplexer array 620 by using a transmission fiber. Each wavelength demultiplexer receives one fundamental-mode optical signal; performs wavelength division demultiplexing processing on the received fundamental-mode optical signal, to obtain three fundamental-mode optical signals each having a single wavelength, that is, a fundamental-mode optical signal whose wavelength is $\lambda_1$, a fundamental-mode optical signal whose wavelength is $\lambda_2$, and a fundamental-mode optical signal whose wavelength is $\lambda_3$; and then, outputs the three fundamental-mode optical signals each having a single wavelength. In this way, the three wavelength demultiplexers in the wavelength demultiplexer array 620 obtain nine fundamental-mode optical signals each having a single wavelength, and the nine fundamental-mode optical signals each having a single wavelength may be transmitted to the 1×2 optical switch array 630 by using a transmission fiber.

In addition, at least one transmitter in the transmitter array 660 may transmit a fundamental-mode optical signal having a single wavelength, and the fundamental-mode optical signals transmitted by the transmitter array 660 are transmitted to the 1×2 optical switch array 630.

Each 1×2 optical switch in the 1×2 optical switch array 630 may receive fundamental-mode optical signals sent by the transmitter array 660 or the wavelength demultiplexer array 620, and transmit the received fundamental-mode optical signals to the 3×3 optical switch array 650.

Each 3×3 optical switch in the 3×3 optical switch array 650 may receive at least one fundamental-mode optical signal with a specific wavelength, and output the at least one fundamental-mode optical signal according to a destination node of the at least one fundamental-mode optical signal. Specifically, if a destination node of a fundamental-mode optical signal that has a single wavelength and is received by a 3×3 optical switch is the switching node 600, the 3×3 optical switch may output the fundamental-mode optical signal from an output port corresponding to the receiver array 640, and the fundamental-mode optical signal is transmitted to the receiver array 640 by using a transmission fiber. If the destination node of the received fundamental-mode optical signal having a single wavelength is not the switching node 600, the 3×3 optical switch may output the fundamental-mode optical signal from an output port corresponding to the wavelength multiplexer array 680.

Each wavelength multiplexer in the wavelength multiplexer array 680 may receive three fundamental-mode optical signals from the 3×3 optical switch array 650, and the three fundamental-mode optical signals have mutually different wavelengths. In this way, the wavelength multiplexer may perform wavelength division multiplexing processing on the three fundamental-mode optical signals with mutually different wavelengths, to obtain one fundamental-mode optical signal including three wavelengths, and then outputs the fundamental-mode optical signal.

The three fundamental-mode optical signals that each include three wavelengths and that are output by the wavelength multiplexer array 680 are transmitted to the mode multiplexer 680 by using a transmission fiber, the mode multiplexer 680 may multiplex the received three fundamental-mode optical signals each including three wavelengths into one optical signal including three modes and three wavelengths, and the optical signal including three modes and three wavelengths may be transmitted to another switching node by using a transmission fiber.

It should be understood that the example in FIG. 14 is intended to help a person skilled in the art better understand the embodiments of the present invention, instead of limiting the scope of the embodiments of the present invention. Apparently, a person skilled in the art performs various equivalent modifications or changes according to the example provided in FIG. 14, and such modifications or changes also fall within the scope of the embodiments of the present invention.

Therefore, the switching node according to this embodiment of the present invention includes a mode demultiplexer, multiple wavelength demultiplexers, and multiple optical switches, can successively perform mode division demultiplexing and wavelength division demultiplexing on an optical signal that includes multiple wavelengths and multiple modes to obtain multiple fundamental-mode optical signals each having a single wavelength, and can route the multiple fundamental-mode optical signals each having a single wavelength by using the multiple optical switches, so as to transmit an optical signal by using a wavelength division multiplexing technology and a mode division multiplexing technology.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mode multiplexer/demultiplexer comprising:
   a multi-mode optical waveguide comprising a first mode channel and a second mode channel, wherein the first mode channel is configured to transmit a first-mode optical signal, the second mode channel is configured to transmit a second-mode optical signal, and a first mode is different from a second mode;
   a first transmission optical waveguide comprising a first coupling region and a first input/output region, the first coupling region and the first input/output region comprising a first fundamental-mode channel, wherein the first fundamental-mode channel is configured to: transmit a first fundamental-mode optical signal and perform, at the first coupling region, optical mode coupling with the first mode channel in the multi-mode optical waveguide; and
   a second transmission optical waveguide comprising a second coupling region and a second input/output region, the second coupling region and the second input/output region comprising a second fundamental-mode channel, wherein the second fundamental-mode channel is configured to: transmit a second fundamental-mode optical signal and perform, at the second coupling region, optical mode coupling with the second mode channel in the multi-mode optical waveguide; wherein
   an effective refractive index in the first coupling region is different from an effective refractive index in the second coupling region.

2. The mode multiplexer/demultiplexer according to claim 1, wherein the first coupling region and the second coupling region are of different widths.

3. The mode multiplexer/demultiplexer according to claim 2, wherein both the first coupling region and the second coupling region are parallel to the multi-mode optical waveguide, and both a distance between the first coupling region and the multi-mode optical waveguide and a distance between the second coupling region and the multi-mode optical waveguide are less than 1 µm.

4. The mode multiplexer/demultiplexer according to claim 1, wherein a width of the first coupling region is different from a width of the first input/output region; and
   the first transmission optical waveguide further comprises a first transition region, wherein two ends of the first transition region are of different widths, and the two ends of the first transition region are respectively connected to the first input/output region and the first coupling region.

5. The mode multiplexer/demultiplexer according to claim 4, wherein there is a non-zero included angle between an optical signal transmission direction in the first coupling region and an optical signal transmission direction in the first input/output region, and the first transition region comprises a curved part.

6. The mode multiplexer/demultiplexer according to claim 1, wherein a width of the multi-mode optical waveguide is a constant value.

7. The mode multiplexer/demultiplexer according to claim 1, wherein when the mode multiplexer/demultiplexer implements mode division multiplexing,
the first input/output region is configured to receive the first fundamental-mode optical signal from a first transmit end, and transmit the first fundamental-mode optical signal to the first coupling region;
the first coupling region is configured to couple, to the first mode channel, the first fundamental-mode optical signal transmitted by the first input/output region;
the second input/output region is configured to receive the second fundamental-mode optical signal from a second transmit end, and transmit the second fundamental-mode optical signal to the second coupling region;
the second coupling region is configured to couple, to the second mode channel, the second fundamental-mode optical signal transmitted by the second input/output region; and
the multi-mode optical waveguide is configured to perform optical mode coupling with the first coupling region to obtain the first-mode optical signal transmitted by the first mode channel, perform optical mode coupling with the second coupling region to obtain the second-mode optical signal transmitted by the second mode channel, and transmit, to a first receive end, the first-mode optical signal and the second-mode optical signal obtained via coupling.

8. The mode multiplexer/demultiplexer according to claim 1, configured to implement mode division demultiplexing, wherein:
the multi-mode optical waveguide is configured to: (a) receive an optical signal from a third transmit end, the optical signal comprising the first-mode optical signal and the second-mode optical signal, (b) couple the first-mode optical signal to the first fundamental-mode channel in the first coupling region, and (c) couple the second-mode optical signal to the second fundamental-mode channel in the second coupling region;
the first coupling region is configured to: (a) obtain, by performing optical mode coupling with the multi-mode optical waveguide, the first fundamental-mode optical signal transmitted by the first fundamental-mode channel, and (b) transmit, to the first input/output region, the first fundamental-mode optical signal obtained via coupling;
the first input/output region is configured to transmit, to a second receive end, the first fundamental-mode optical signal transmitted by the first coupling region;
the second coupling region is configured to: (a) obtain, by performing optical mode coupling with the multi-mode optical waveguide, the second fundamental-mode optical signal transmitted by the second fundamental-mode channel, and (b) transmit, to the second input/output region, the second fundamental-mode optical signal obtained via coupling; and
the second input/output region is configured to transmit, to a third receive end, the second fundamental-mode optical signal transmitted by the second coupling region.

9. A switching node comprising:
a mode demultiplexer comprising:
a first multi-mode optical waveguide comprising a first mode channel and a second mode channel, wherein the first mode channel is configured to transmit a first-mode optical signal, the second mode channel is configured to transmit a second-mode optical signal, and a first mode is different from a second mode,
a first transmission optical waveguide comprising a first coupling region and a first input/output region, the first coupling region and the first input/output region comprising a first fundamental-mode channel, wherein the first fundamental-mode channel is configured to: transmit a first fundamental-mode optical signal and perform, at the first coupling region, optical mode coupling with the first mode channel in the first multi-mode optical waveguide, and
a second transmission optical waveguide comprising a second coupling region and a second input/output region, the second coupling region and the second input/output region comprising a second fundamental-mode channel, wherein the second fundamental-mode channel is configured to transmit: a second fundamental-mode optical signal and perform, at the second coupling region, optical mode coupling with the second mode channel in the first multi-mode optical waveguide, wherein an effective refractive index in the first coupling region is different from an effective refractive index in the second coupling region;
$N_1$ wavelength demultiplexers; and
$M_1$ optical switches, wherein $1<N_1 \leq N$, N is an integer greater than or equal to 2, and $M_1$ is an integer greater than 1;
wherein the mode demultiplexer is configured to:
receive an optical signal, the optical signal comprising optical signals that are in $N_2$ modes and that have $M_2$ wavelengths, wherein $M_2 \leq M_1$, and $1<N_2 \leq N_1$,
split the optical signal into $N_2$ fundamental-mode optical signals, and
transmit the $N_2$ fundamental-mode optical signals to the $N_1$ wavelength demultiplexers, wherein each of the $N_2$ fundamental-mode optical signals is an optical signal with at least one wavelength;
wherein a first wavelength demultiplexer in the $N_1$ wavelength demultiplexers is configured to:
receive one of the $N_2$ fundamental-mode optical signals that is transmitted by the mode demultiplexer and that comprises $M_2$ wavelengths,
split the received one of the $N_2$ fundamental-mode optical signals into $M_2$ fundamental-mode optical signals, and
transmit the obtained $M_2$ fundamental-mode optical signals to the $M_1$ optical switches, wherein each of the $M_2$ fundamental-mode optical signals has a single wavelength, and wavelengths of the $M_2$ fundamental-mode optical signals are mutually different; and
wherein a first optical switch in the $M_1$ optical switches is configured to receive at least one fundamental-mode optical signal that is transmitted by the $N_1$ wavelength demultiplexers and that has a single wavelength, and route the at least one fundamental-mode optical signal according to a destination node of the at least one fundamental-mode optical signal.

10. The switching node according to claim 9 further comprising at least one receiver wherein:
the first optical switch is further configured to: if a destination node of a first fundamental-mode optical signal in the at least one fundamental-mode optical signal is the switching node, transmit the first fundamental-mode optical signal to a receiver in the at least one receiver; and
a first receiver in the at least one receiver is configured to receive the first fundamental-mode optical signal transmitted by the first optical switch.

11. The switching node according to claim 9, further comprising:
$N_3$ wavelength multiplexers, wherein $N_3$ is an integer greater than 1; and
a mode multiplexer comprising:
a second multi-mode optical waveguide comprising a third mode channel and a fourth mode channel, wherein the third mode channel is configured to transmit a third-mode optical signal, the fourth mode channel is configured to transmit a fourth-mode optical signal, and a third mode is different from a fourth mode,
a third transmission optical waveguide comprising a third coupling region and a third input/output region, the third coupling region and the third input/output region comprising a third fundamental-mode channel, wherein the third fundamental-mode channel is configured to transmit a fundamental-mode optical signal and perform, at the third coupling region, optical mode coupling with the third mode channel in the second multi-mode optical waveguide, and
a fourth transmission optical waveguide comprising a fourth coupling region and a fourth input/output region, the fourth coupling region and the fourth input/output region comprising a fourth fundamental-mode channel, wherein the fourth fundamental-mode channel is configured to transmit: a fundamental-mode optical signal and perform, at the fourth coupling region, optical mode coupling with the fourth mode channel in the second multi-mode optical waveguide, wherein an effective refractive index in the third coupling region is different from an effective refractive index in the fourth coupling region;
wherein the first optical switch is further configured to: if a destination node of a fourth fundamental-mode optical signal in the at least one fundamental-mode optical signal is not the switching node, transmit the fourth fundamental-mode optical signal to a wavelength multiplexer in the $N_3$ wavelength multiplexers;
wherein a first wavelength multiplexer in the $N_3$ wavelength multiplexers is configured to receive multiple fundamental-mode optical signals transmitted by the $M_1$ optical switches, multiplex the multiple fundamental-mode optical signals into one fundamental-mode optical signal, and transmit the obtained fundamental-mode optical signal to the mode multiplexer, wherein wavelengths of the multiple fundamental-mode optical signals are mutually different; and
wherein the mode multiplexer is configured to receive multiple fundamental-mode optical signals transmitted by the $N_3$ wavelength multiplexers, multiplex the multiple fundamental-mode optical signals into one optical signal comprising multiple different modes, and send the obtained optical signal comprising the multiple different modes.

12. The switching node according to claim 11 further comprising:
at least one transmitter configured to transmit at least one fundamental-mode optical signal to the $M_1$ optical switches, wherein each of the at least one fundamental-mode optical signal has a single wavelength;
wherein a second optical switch in the $M_1$ optical switches is configured to receive the at least one fundamental-mode optical signal transmitted by the at least one transmitter.

* * * * *